(12) United States Patent
Yamahira

(10) Patent No.: US 9,318,971 B2
(45) Date of Patent: Apr. 19, 2016

(54) SWITCHING POWER SUPPLY APPARATUS

(71) Applicant: PANASONIC CORPORATION, Osaka (JP)

(72) Inventor: Seiji Yamahira, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 252 days.

(21) Appl. No.: 14/139,505

(22) Filed: Dec. 23, 2013

(65) Prior Publication Data

US 2014/0112043 A1   Apr. 24, 2014

Related U.S. Application Data

(63) Continuation of application No. PCT/JP2012/004233, filed on Jun. 29, 2012.

(30) Foreign Application Priority Data

Jul. 4, 2011  (JP) .................... 2011-148411

(51) Int. Cl.
  *H02M 7/217* (2006.01)
  *H02M 5/293* (2006.01)
  *H02M 1/34* (2007.01)

(52) U.S. Cl.
  CPC .............. *H02M 7/217* (2013.01); *H02M 5/293* (2013.01); *H02M 1/34* (2013.01)

(58) Field of Classification Search
  CPC ......... H02M 1/32; H02M 1/34; H02M 5/293; H02M 7/217; H02M 7/23
  See application file for complete search history.

(56) References Cited

U.S. PATENT DOCUMENTS

| | | | |
|---|---|---|---|
| 6,269,012 B1 | 7/2001 | Kusakabe et al. | |
| 6,606,257 B2 | 8/2003 | Bourdillon | |
| 7,164,589 B1 | 1/2007 | Soldano et al. | |
| 8,106,636 B2 | 1/2012 | Asinovski et al. | |
| 8,861,238 B2 * | 10/2014 | Huang | H02M 7/217 363/127 |
| 2003/0086280 A1 | 5/2003 | Bourdillon | |
| 2007/0008747 A1 | 1/2007 | Soldano et al. | |

(Continued)

FOREIGN PATENT DOCUMENTS

| | | |
|---|---|---|
| CN | 1266212 A | 9/2000 |
| CN | 1296330 A | 5/2001 |
| CN | 1489272 A | 4/2004 |

(Continued)

OTHER PUBLICATIONS

International Search Report issued in PCT/JP2012/004233 with Date of mailing Oct. 2, 2012, with English Translation.

(Continued)

*Primary Examiner* — Matthew Nguyen
(74) *Attorney, Agent, or Firm* — McDermott Will & Emery LLP

(57) ABSTRACT

A switching power supply apparatus which receives AC voltage and includes: a transformer including a primary winding and a secondary winding; a first bidirectional switch connected in series with the primary winding; and a Snubber circuit connected in parallel with the primary winding. The AC voltage is applied to a series circuit which includes the primary winding and the first bidirectional switch. The Snubber circuit includes a second bidirectional switch for controlling the first bidirectional switch.

23 Claims, 14 Drawing Sheets

(56) References Cited

U.S. PATENT DOCUMENTS

| | | |
|---|---|---|
| 2009/0212758 A1 | 8/2009 | Asinovski et al. |
| 2013/0170252 A1* | 7/2013 | Nishino .................. H02M 1/08 363/21.02 |

FOREIGN PATENT DOCUMENTS

| | | |
|---|---|---|
| CN | 1582525 A | 2/2005 |
| CN | 1585253 A | 2/2005 |
| CN | 101521464 A | 9/2009 |
| CN | 101919147 A | 12/2010 |
| JP | 08-228484 A | 9/1996 |
| JP | 09-201057 A | 7/1997 |
| JP | 2002-078328 A | 3/2002 |
| JP | 2007-028894 A | 2/2007 |
| JP | 2008-289228 A | 11/2008 |

OTHER PUBLICATIONS

Chinese Office Action and Search Report issued in Chinese Application No. 201280031003.0 dated Aug. 20, 2015, with partial English translation.

* cited by examiner

|  | State 1 | State 2 | State 3 | State 4 |
|---|---|---|---|---|
| Sig1 | L | H | H | L |
| Sig2 | L | H | L | H |
| Equivalent circuit | S1 open S2 | S1 open S2 | S1 diode S2 | S1 diode S2 |

SWITCHING POWER SUPPLY APPARATUS

CROSS REFERENCE TO RELATED APPLICATION

This is a continuation application of PCT International Application No. PCT/JP2012/004233 filed on Jun. 29, 2012, designating the United States of America, which is based on and claims priority of Japanese Patent Application No. 2011-148411 filed on Jul. 4, 2011. The entire disclosures of the above-identified applications, including the specifications, drawings and claims are incorporated herein by reference in their entirety.

FIELD

The present disclosure relates to switching power supply apparatuses which receive AC voltage.

BACKGROUND

There are various types of conventional switching power supply apparatuses.

FIG. 14 is a circuit diagram showing a configuration of a switching power supply apparatus disclosed in Patent Literature (PTL) 1.

A switching power supply apparatus 900 controls on and off of a normally-on bidirectional switch 10 to directly convert AC voltage Vac of an AC source connected to a primary winding of a transformer into power of a secondary winding of the transformer and generate DC voltage.

The switching power supply apparatus 900 includes: the AC source; two gates G1 and G2; the normally-on bidirectional switch 10 controlled by the gates G1 and G2; a switch M1 which causes a short circuit between the gate G2 and a source S2 according to a control signal PWM; a switch M2 which causes a short circuit between the gate G1 and a source S1 according to a control signal PWM; a diode D2 which sets voltage of the gate G2 of the bidirectional switch 10 to be lower than that of the source S2 when the switch M1 is off; a resistance R1 which limits current of the diode D2; a diode D3 which sets voltage of the gate G1 of the bidirectional switch 10 to be lower than that of the source S1 when the switch M2 is off; a resistance R2 which limits current of the diode D3; transformers L1A and L1B each including a primary winding and a secondary winding; rectifier diodes D10 and D20; an inductance L40; a smoothing capacitance CL; and a load Z.

Hereinafter, a brief description will be given of an operation of the switching power supply apparatus 900.

When AC voltage Vac of the AC source is 0 V or above (positive voltage), the switch M2 is always set to be on, and the gate G1 and the source S1 of the bidirectional switch 10 are set to the same electric potential. On the other hand, the switch M1 is turned on and off according to the control signal PWM.

When the switch M1 is on, the gate G2 and the source S2 of the bidirectional switch 10 are set to the same potential, turning on the bidirectional switch 10. This causes a current flow in the primary winding of the transformer L1A, and current generated in the secondary winding is supplied to the inductance L40 and the smoothing capacitance CL via the rectifier diode D10. As a result, DC voltage is generated.

When the switch M1 is off, charges in the gate G2 of the bidirectional switch 10 are drawn via the diode D2 and the resistance R1, making the voltage of the gate G2 of the bidirectional switch 10 lower than that of the source S2. As a result, the bidirectional switch 10 is turned off. This interrupts current supply to the primary winding of the transformer L1A.

When AC voltage Vac of the AC source is less than 0 V (negative voltage), the switch M1 is always set to be on, and the gate G2 and the source S2 of the bidirectional switch 10 are set to the same potential. On the other hand, the switch M2 is turned on and off according to the control signal PWM.

When the switch M2 is on, the gate G1 and the source S1 of the bidirectional switch 10 are set to the same potential, turning on the bidirectional switch 10. This causes a current flow in the primary winding of the transformer L1B, and current generated in the secondary winding is supplied to the inductance L40 and the smoothing capacitance CL via the rectifier diode D20. As a result, DC voltage is generated.

When the switch M2 is off, charges in the gate G1 of the bidirectional switch 10 are drawn via the diode D3 and the resistance R2, making the voltage of the gate G1 of the bidirectional switch 10 lower than that of the source S1. As a result, the bidirectional switch 10 is turned off. This interrupts current supply to the primary winding of the transformer L1B.

In accordance with above, the switching power supply apparatus 900 is capable of converting the AC voltage Vac of the AC source to power of the secondary windings of the transformers L1A and L1B, by controlling the gates G1 and G2 of the bidirectional switch 10. More specifically, it is possible to convert the AC voltage Vac of the AC source to power of the secondary windings of the transformer L1A and L1B without converting the AC voltage Vac of the AC source to DC current and voltage.

CITATION LIST

Patent Literature

[NPL 1] Japanese Unexamined Patent Application Publication No. 2007-028894

SUMMARY

Technical Problem

However, the above switching power supply apparatus has a problem described below.

When AC voltage Vac of the AC source is 0 V or above and the switch M1 is on, part of current flowing through the bidirectional switch 10 also flows through the diode D2 and the resistance R1 via the switch M1. This decreases current flowing through the primary winding of the transformer L1A.

When AC voltage Vac of the AC source is less than 0 V, the switch M1 is off, and no current is supplied from the bidirectional switch 10, charges in the gate G2 of the bidirectional switch 10 are drawn via the diode D2, and charges are drawn from the source S2 of the bidirectional switch 10 via the primary winding of the transformer L1A. This makes the gate G2 and the source S2 of the bidirectional switch 10 have an almost same potential, which causes current flow via the bidirectional switch 10 even though the switch M1 is off.

In the similar manner, when AC voltage Vac of the AC source is less than 0 V and the switch M2 is on, part of the current flowing through the bidirectional switch 10 also flows through the diode D3 and the resistance R2 via the switch M2. This decreases the current flowing through the primary winding of the transformer L1B.

When AC voltage Vac of the AC source Vac is less than 0 V, the switch M2 is off, and no current is supplied from the bidirectional switch 10, charges are drawn from the gate G1 of the bidirectional switch 10 via the diode D3, and charges are drawn from the source S1 of the bidirectional switch 10 via the primary winding of the transformer L1B. This makes the gate G2 and the source S2 of the bidirectional switch 10 have an almost same potential, which causes current flow via the bidirectional switch 10 even though the switch M2 is off.

In other words, the switching power supply apparatus 900 has a problem below. When the normally-on bidirectional switch is turned on, extra current flows via a switch for controlling the gate of the bidirectional switch. Even if the bidirectional switch is to be turned off, the flow of extra current prevents the bidirectional switch from turning off completely, which keeps a current flow.

A possible method to solve the problem is to decrease constantly flowing current by using a normally-off bidirectional switch. Furthermore, further miniaturization of the switching power supply apparatus can be aimed at by applying the normally-off bidirectional switch to a flyback switching converter instead of a forward switching converter. However, the above method may have a problem in that switching the normally-off bidirectional switch from on to off increases the potential difference between the terminals of the switch which controls the current flowing through the primary winding of the transformer.

In view of this, the present disclosure has a first object to suppress an increase in the potential difference between the terminals of the switch which controls the current flowing through the primary winding of the transformer.

Solution to Problem

In order to solve the above problems, the switching power supply apparatus according to an aspect of the present disclosure is a switching power supply apparatus which receives an AC voltage. The switching power supply apparatus includes: a transformer including a primary winding and a secondary winding; a first bidirectional switch connected in series with the primary winding; and a Snubber circuit connected in parallel with the primary winding, wherein the AC voltage is applied to a series circuit including (i) the primary winding and (ii) the first bidirectional switch, and the Snubber circuit includes a second bidirectional switch for controlling the first bidirectional switch.

Advantageous Effects

With the above configuration, it is possible to regulate current flowing through the primary winding of the transformer, by using a first bidirectional switch. Furthermore, it is also possible to suppress an increase in the potential difference between the terminals of the first bidirectional switch, by including a Snubber circuit which includes a second bidirectional switch.

BRIEF DESCRIPTION OF DRAWINGS

These and other objects, advantages and features of the invention will become apparent from the following description thereof taken in conjunction with the accompanying drawings that illustrate a specific embodiment of the present disclosure.

DESCRIPTION OF EMBODIMENTS

Figure 1:
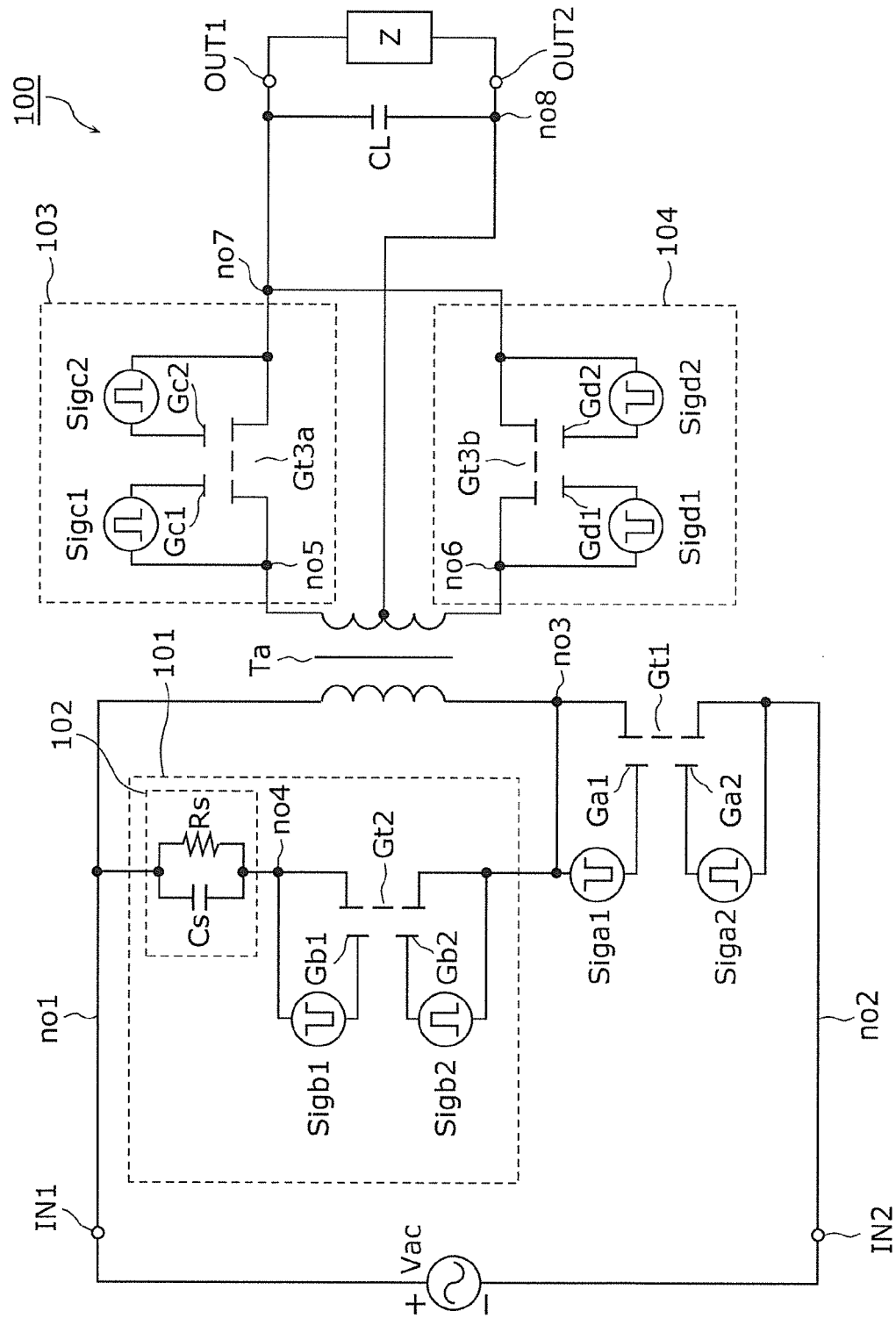
FIG. 1 is a circuit diagram showing a configuration of a switching power supply apparatus according to Embodiment 1.

Underlying Knowledge Forming Basis of the Present Disclosure

In relation to the switching power supply apparatus which is disclosed in the Background section and which performs power conversion by controlling two gates of the bidirectional switches, the inventors have found problems described below.

As described above, the first problem is that switching the normally-off bidirectional switch from on to off may cause an increase in the potential difference between the terminals of the switch which controls current flowing through the primary winding of the transformer.

The second problem is that for performing flyback operation by applying AC voltage to the primary winding of the transformer, a rectifier circuit is required at the secondary winding side of the transformer. The required rectifier circuit stores energy in the transformer when the normally-off bidirectional switch is on, and performs rectification when the bidirectional switch is off.

In view of this, the present disclosure has: a first object that is suppressing an increase in the potential difference between the terminals of the switch which controls current flowing through the primary winding of the transformer; and a second object that is providing a switching power supply apparatus which allows rectification to be performed at the secondary winding side when AC voltage (reference voltage, for example, voltage with positive and negative amplitudes relative to 0 V) is applied to the primary winding of the transformer.

In order to achieve the first object, the switching power supply apparatus according to an aspect of the present disclosure is a switching power supply apparatus which receives an AC voltage. The switching power supply apparatus includes: a transformer including a primary winding and a secondary winding; a first bidirectional switch connected in series with the primary winding; and a Snubber circuit connected in parallel with the primary winding, wherein the AC voltage is applied to a series circuit including (i) the primary winding and (ii) the first bidirectional switch, and the Snubber circuit includes a second bidirectional switch for controlling the first bidirectional switch.

As described above, it is possible to regulate current flowing through the primary winding of the transformer, by using the first bidirectional switch connected to the primary winding of the transformer. Furthermore, it is possible to suppress an increase in the potential difference between the terminals of the first bidirectional switch, by including a Snubber circuit which includes a second bidirectional switch.

Furthermore, in the switching power supply apparatus according to one aspect of the present disclosure, it may be that the second bidirectional switch includes a first gate and a second gate.

With this, it is possible to control the second bidirectional switch according to the control signals applied to the first gate and the second gate.

Furthermore, in the switching power supply apparatus according to one aspect of the present disclosure, it may be that the Snubber circuit further includes a first control unit configured to control the second bidirectional switch by applying a first control signal to the first gate and applying a second control signal to the second gate, the first control signal repeatedly switches between a first level voltage and a second level voltage that is different from the first level voltage, and the second control signal repeatedly switches between the first level voltage and the second level voltage in opposite phase to the first control signal.

Furthermore, in the switching power supply apparatus according to one aspect of the present disclosure, it may be that the switching between the first level voltage and the second level voltage of each of the first control signal and the second control signal is synchronous with switching between polarities of the AC voltage.

With this, it is possible to change the state of the second bidirectional switch in synchronization with switching between polarities of AC voltage.

Furthermore, in the switching power supply apparatus according to one aspect of the present disclosure, it may be that the second bidirectional switch exhibits a diode characteristic in which conduction is established in one of two directions, when the first level voltage is applied to the first gate and the second level voltage is applied to the second gate, and the second bidirectional switch exhibits a diode characteristic in which conduction is established in an opposite direction to the one of the two directions, when the second level voltage is applied to the first gate, and the first level voltage is applied to the second gate.

With this, it is possible to change the diode characteristic of the second bidirectional switch in synchronization with switching between polarities of AC voltage. More specifically, it is possible to change the direction of current flowing through the Snubber circuit. As a result, the second bidirectional switch does not cause an extra current flow, which increases power conversion efficiency in the switching power supply apparatus.

Furthermore, in the switching power supply apparatus according to one aspect of the present disclosure, it may be that the Snubber circuit further includes a first control unit configured to control the second bidirectional switch by applying a first control signal to the first gate and applying a second control signal to the second gate, the first control signal repeatedly switches between a first level voltage and a second level voltage that is different from the first level voltage, and the second control signal repeatedly switches between the first level voltage and the second level voltage, in phase with the first control signal.

Furthermore, in the switching power supply apparatus according to one aspect of the present disclosure, it may be that the first bidirectional switch includes a third gate and a fourth gate, the switching power supply apparatus further includes a second control unit configured to control the first bidirectional switch by applying a third control signal to the third gate and applying a fourth control signal to the fourth gate, the third control signal repeatedly switches between a third level voltage and a fourth level voltage that is different from the third level voltage, the fourth control signal repeatedly switches between the third level voltage and the fourth level voltage, in phase with the third control signal, and the first control signal and the second control signal are in an opposite phase to the third control signal and the fourth control signal.

With this, it is possible to cause the first bidirectional switch and the second bidirectional switch to operate with different characteristics.

Furthermore, in the switching power supply apparatus according to an aspect of the present disclosure, it may be that the second bidirectional switch exhibits a characteristic in which conduction is established in two directions, when the first level voltage is applied to the first gate and the first level voltage is applied to the second gate, and the second bidirectional switch exhibits a characteristic in which no conduction is established in both of the two directions when the second level voltage is applied to the first gate and the second level voltage is applied to the second gate.

With this, it is possible to switch between on and off characteristics of the second bidirectional switch.

Furthermore, the switching power supply apparatus according to another aspect of the present disclosure is a switching power supply apparatus which receives an AC voltage. The switching power supply apparatus includes: a transformer including a primary winding and a secondary winding; a bidirectional switch connected in series with the primary winding; and a Snubber circuit connected in parallel with the primary winding, wherein the AC voltage is applied to a series circuit including (i) the primary winding and (ii) the bidirectional switch, and the Snubber circuit includes an element which is switchable between (i) a first diode characteristic in which conduction is established in a single direction and (ii) a second diode characteristic in which conduction is established in an opposite direction to the single direction.

As described above, it is possible to regulate current flowing through the primary winding of the transformer, by using the bidirectional switch connected to the primary winding of the transformer. Furthermore, it is possible to suppress an increase in the potential difference between the terminals of the bidirectional switch, by including the Snubber circuit which includes the element.

Furthermore, the switching power supply apparatus according to the aspect of the present disclosure, may further include a control unit configured to switch between the first diode characteristic and the second diode characteristic of the element in synchronization with switching between polarities of the AC voltage.

With this, it is possible to change the diode characteristic of the element in synchronization with switching between polarities of AC voltage. More specifically, it is possible to change the direction of current flowing through the Snubber circuit. As a result, the element does not cause an extra current flow, which increases power conversion efficiency in the switching power supply apparatus.

Furthermore, in order to achieve the second object, the switching power supply apparatus according to yet another aspect of the present disclosure is a switching power supply apparatus which converts an input AC voltage into a DC voltage. The switching power supply apparatus includes: an output terminal for outputting the DC voltage; a transformer including a primary winding and a secondary winding; a first bidirectional switch connected in series with the primary winding; and a full-wave rectifier circuit between (i) a first terminal and a second terminal of the secondary winding and (ii) the output terminal, the full-wave rectifier circuit including a first current path and a second current path each of which is switchable between conduction and non-conduction, wherein the AC voltage is applied to a series circuit including (i) the primary winding and (ii) the first bidirectional switch, and the full-wave rectifier circuit performs full-wave rectification on a voltage applied to the primary winding, by performing selective switching such that conduction is established in one of the first current path and the second current path and no conduction is established in the other one of the first current path and the second current path.

With this, it is possible to perform rectification at the secondary winding side when applying AC voltage to the primary winding of the transformer. More specifically, it is possible to achieve a full-wave rectifier circuit connected to the secondary winding of the transformer. The full-wave rectifier circuit stores energy in the transformer when the first bidirectional switch is on and performs rectification when the first bidirectional switch is off.

Furthermore, in the switching power supply apparatus according to the yet another aspect of the present disclosure, it may be that the secondary winding includes an intermediate terminal between the first terminal and the second terminal of the secondary winding, the first current path includes a third bidirectional switch between the first terminal of the secondary winding and the output terminal, the second current path includes a fourth bidirectional switch between the second terminal of the secondary winding and the output terminal, and the intermediate terminal is connected to ground.

Furthermore, in the switching power supply apparatus according to the yet another aspect of the present disclosure, it may be that the third bidirectional switch includes a fifth gate and a sixth gate, and the fourth bidirectional switch includes a seventh gate and a eighth gate.

With this, it is possible to control the third bidirectional switch according to the control signals applied to the fifth gate and the sixth gate. Furthermore, it is possible to control the fourth bidirectional switch according to the control signals applied to the seventh gate and the eighth gate.

Furthermore, the switching power supply apparatus according to the yet another aspect of the present disclosure may further include a control unit configured to apply, to the sixth gate, a fifth control signal which repeatedly switches between a first level voltage and a second level voltage, and apply, to the eighth gate, a sixth control signal which repeatedly switches between the first level voltage and the second level voltage, in an opposite phase to the fifth control signal.

With this, it is possible to exclusively control conduction and non-conduction of the first current path and the second current path.

Furthermore, in the switching power supply apparatus according to the yet another aspect of the present disclosure, it may be that the switching between the first level voltage and the second level voltage of each of the fifth control signal and the sixth control signal is synchronous with switching between polarities of the AC voltage.

With this, it is possible to appropriately switch between the first current path and the second current path, which increases the power conversion efficiency in the switching power supply apparatus.

Furthermore, in the switching power supply apparatus according to the yet another aspect of the present disclosure, it may be that the fifth gate is connected to the first terminal of the secondary winding, and the seventh gate is connected to the second terminal of the secondary winding.

With this, a control unit for controlling the fifth gate and the sixth gate need not be added, which allows miniaturization of the switching power supply apparatus.

Furthermore in the switching power supply apparatus according to the yet another aspect of the present disclosure, it may be that the full-wave rectifier circuit includes: a first switch between the first terminal of the secondary winding and ground, the first switch being capable of setting a voltage at the first terminal of the secondary winding to a ground voltage by being turned on according to the fifth control signal; a second switch between the second terminal of the secondary winding and the ground, the second switch being capable of setting a voltage at the second terminal of the secondary winding to the ground voltage by being turned on according to the sixth control signal; a first diode between the first terminal of the secondary winding and the output terminal; and a second diode between the second terminal of the secondary winding and the output terminal.

With this, a control unit and the like for switching between the first current path and the second current path need not be added, allowing reduction in component cost. Furthermore, it is possible to obtain the converted DC voltage that is relative to the ground voltage.

Furthermore, in the switching power supply apparatus according to the yet another aspect of the present disclosure, it may be that the first switch includes a ninth gate and is turned on according to a voltage applied to the ninth gate, the second switch includes a tenth gate and is turned on according to a voltage applied to the tenth gate, and the switching power supply apparatus further includes a control circuit which (i) applies, to the ninth gate, a fifth control signal which repeatedly switches between a first level voltage and a second level voltage, and (ii) applies, to the tenth gate, a sixth control signal which repeatedly switches between the first level voltage and the second level voltage, in an opposite phase to the fifth control signal.

Furthermore, in the switching power supply apparatus according to the yet another aspect of the present disclosure, it may be that the switching between the first level voltage and the second level voltage of each of the fifth control signal and the sixth control signal is synchronous with switching between polarities of the AC voltage.

Furthermore, the switching power supply apparatus according to the yet another aspect of the present disclosure may further include a voltage detecting circuit which determines a polarity of the AC voltage from a potential difference between two terminal of the series circuit including the primary winding and the bidirectional switch.

With this, it is possible to detect the timing at which the polarity of AC voltage is switched. As a result, it is possible to more appropriately switch between the first current path and the second current path, which allows further increase in the power conversion efficiency in the switching power supply apparatus.

Furthermore, the switching power supply apparatus according to the yet another aspect of the present disclosure is a switching power supply apparatus which converts an input AC voltage to a DC voltage to supply the DC voltage to a load. The switching power supply apparatus includes: a first output terminal and a second output terminal which are connected to each other with the load therebetween, and which are for outputting the DC voltage; a transformer including a primary winding and a secondary winding; and a first bidirectional switch connected in series with the primary winding, wherein the AC voltage is applied to a series circuit including (i) the primary winding and (ii) the first bidirectional switch, the secondary winding includes a first terminal, a second terminal, and a third terminal, the switching power supply apparatus further includes: a second bidirectional switch between the first terminal and the first output terminal; and a third bidirectional switch between the second terminal and the second output terminal, and the third terminal is electrically connected to the second output terminal.

It is possible to control current flowing through the primary winding of the transformer, by using the first bidirectional switch connected to the primary winding of the transformer in such a manner. With this, it is possible to perform rectification at the secondary winding side when applying AC voltage to the primary winding of the transformer. More specifically, it is possible to achieve a circuit connected to the secondary winding of the transformer. The circuit stores energy in the transformer when the first bidirectional switch is on and performs rectification when the first bidirectional switch is off.

Furthermore, in the switching power supply apparatus according to the yet another aspect of the present disclosure, it may be that each of the first bidirectional switch, the second bidirectional switch and the third bidirectional switch includes a first gate and a second gate.

With this, it is possible to control each of the first, second, and third bidirectional switches, according to control signals applied to the first gate and the second gate.

Furthermore, in the switching power supply apparatus according to the yet further aspect of the present disclosure, it may be that the second bidirectional switch and the third bidirectional switch are controlled according to a polarity of the AC voltage.

Hereinafter, embodiments of the present disclosure are described in greater detail with reference to the accompanying Drawings. The same or corresponding structural elements in the drawings are assigned with the same referential numerals and their descriptions are omitted. Furthermore, each of the embodiments described below shows a specific example of the present disclosure. The structural elements, connection of the structural elements, and the like shown in the following embodiments are mere examples, and therefore do not limit the present disclosure. Among the structural elements in the following embodiments, structural elements not recited in any one of the independent claims are described as arbitrary structural elements.

Embodiment 1

Configuration

FIG. 1 is a circuit diagram showing a configuration of a switching power supply apparatus 100 according to Embodiment 1 of the present disclosure.

The switching power supply apparatus 100 in FIG. 1 converts AC voltage input from input terminals IN1 and IN2 to DC voltage, and supplies the DC voltage to a load Z through output terminals OUT1 and OUT2.

The switching power supply apparatus 100 includes a transformer Ta which includes a primary winding and a secondary winding having a center tap (also referred to as an intermediate terminal). The primary winding side of the transformer Ta includes: a normally-off bidirectional switch Gt1 which is connected in series with the transformer Ta and which is controlled according to control signals Siga1 and Siga2; and a Snubber circuit 101 connected in parallel with the bidirectional switch Gt1. The Snubber circuit 101 includes: a normally-off bidirectional switch Gt2 which is controlled according to control signals Sigb1 and Sigb2: and a voltage suppression circuit 102 which includes a resistance Rs and a capacitance Cs (diode, although not shown in FIG. 1).

Furthermore, the switching power supply apparatus 100 includes, at the secondary winding side of the transformer Ta, rectifier circuits 103 and 104, and a smoothing capacitance CL. The rectifier circuit 103 includes a normally-off bidirectional switch Gt3$a$ controlled according to control signals Sigc1 and Sigc2. The rectifier circuit 104 includes a normally-off bidirectional switch Gt3$b$ controlled according to control signals Sigd1 and Sigd2. Here, nodes no1 to no8 shown in FIG. 1 are intermediate nodes.

In the switching power supply apparatus 100 with the above configuration, AC voltage Vac of the AC source is applied to a series circuit which includes the transformer Ta and the bidirectional switch Gt1.

Normally-Off Bidirectional Switch

Next, referring to FIG. 2A and FIG. 2B, descriptions will be given of relationship between bias condition and operating state in the normally-off bidirectional switches Gt1, Gt2, Gt3$a$, and Gt3$b$ (hereinafter, these switches may be collectively referred to as Gt).

Figures 2A, 2B:
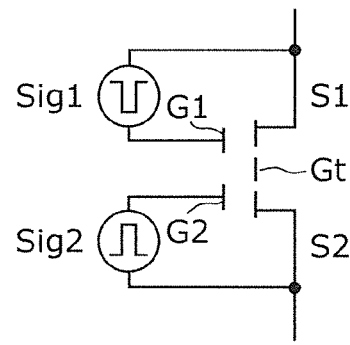
FIG. 2A is a diagram showing an electrical configuration of a normally-off bidirectional switch.
FIG. 2B is a table showing relationship between bias condition and operating state in the normally-off bidirectional switch.

FIG. 2A is a diagram showing an electrical configuration of the normally-off bidirectional switch Gt.

The bidirectional switch Gt includes: gates G1 and G2, and sources S1 and S2. The gate G1 is controlled by the control signal Sig1 having an amplitude between VS1 (=Low state) and VS1+α (=High state where α is greater than or equal to a threshold voltage of the bidirectional switch), with voltage VS1 of the source S1 serving as a reference voltage. On the other hand, the gate G2 is controlled by the control signal Sig2 having an amplitude between VS2 (=Low state) and VS2+α (=High state where a is greater than or equal to the threshold voltage of the bidirectional switch), with voltage VS2 of the source S2 serving as a reference voltage. Hereinafter, the low state may be referred to as L, and the high state may be referred to as H.

FIG. 2B is a table showing relationship between bias condition and operating state in the normally-off bidirectional switch Gt. More specifically, the table shows equivalent circuits of the bidirectional switch Gt at application of the control signals Sig1 and Sig2.

When the control signal Sig1=L, and Sig2=L, the equivalent circuit of the bidirectional switch Gt is a switch that is in an off state (State 1). More specifically, no conduction is established between the source S1 and the source S2.

When the control signal Sig1=H and the control signal Sig2=H, the equivalent circuit of the bidirectional switch Gt is a switch that is in an on state (State 2). More specifically, the source S1 and the source S2 are short circuited, which allows current to flow between the source S1 and the source S2.

More specifically, when H is applied to the gate G1 and H is applied to the gate G2, the bidirectional switch Gt exhibits the characteristic in that bidirectional conduction is established as shown in the state 2 in FIG. 2B. When L is applied to the gate G1 and L is applied to the gate G2, the bidirectional switch Gt exhibits the characteristic in that no conduction is established in any directions as shown in the state 1 in FIG. 2B.

When the control signal Sig1=H and the control signal Sig2=L, the equivalent circuit of the bidirectional switch Gt is a diode having the source S2 serving as an anode and the source S1 serving as a cathode (State 3). More specifically, it is possible to cause current to flow in a single direction from the source S2 to the source S1.

When the control signal Sig1=L and the control signal Sig2=H, the equivalent circuit of the bidirectional switch Gt is a diode having the source S1 serving as an anode and the source S2 serving as a cathode (State 4). More specifically, it is possible to cause current to flow in a single direction from the source S1 to the source S2.

More specifically, when H is applied to the gate G1 and L is applied to the gate G2, the bidirectional switch Gt exhibits the diode characteristic in that conduction is established in one of two directions as shown in the state 3 in FIG. 2B. On the other hand, when L is applied to the gate G1 and H is applied to the gate G2, the bidirectional switch Gt exhibits the diode characteristic in that conduction is established in the opposite direction to the direction in the state 3, as shown in the state 4 in FIG. 2B.

As described above, the bidirectional switch Gt includes two gates (the gate G1 and the gate G2), and can be controlled according to the control signals applied to the gates G1 and G2.

Figure 3:
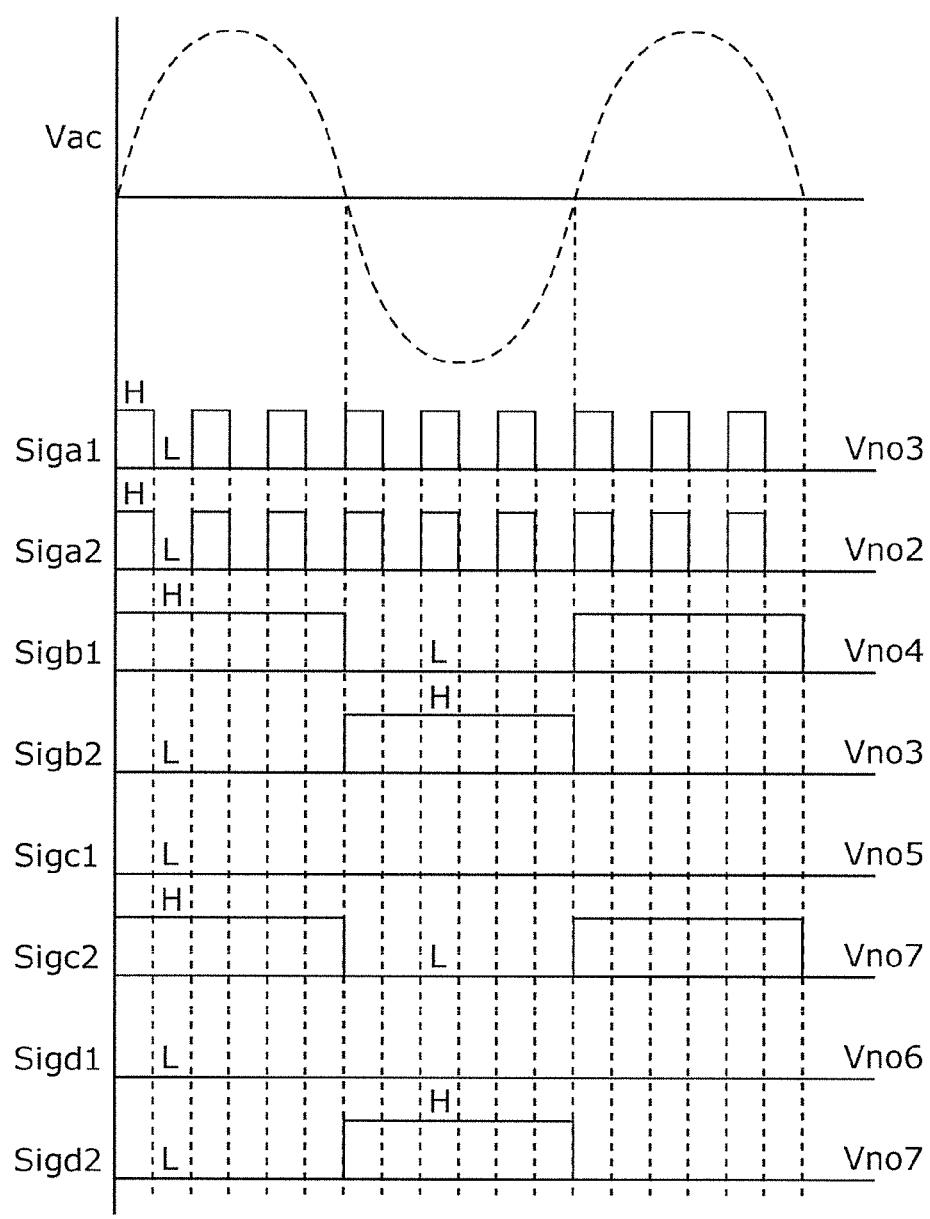
FIG. 3 is a timing chart showing an example of an operation of the switching power supply apparatus according to Embodiment 1.
Figure 4A:
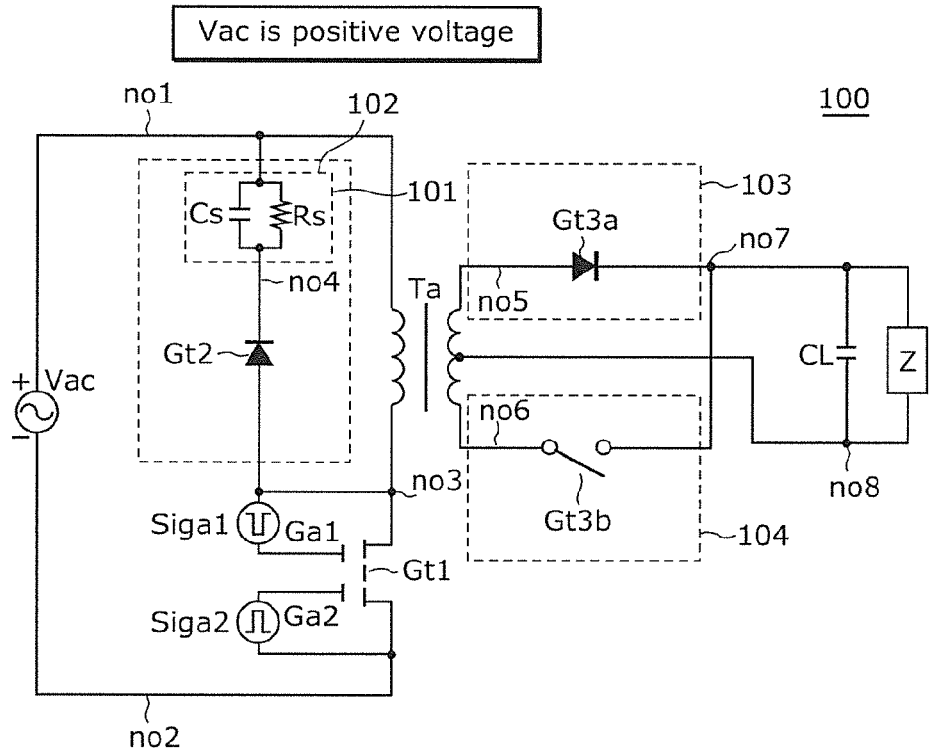
FIG. 4A is an equivalent circuit diagram of a switching power supply apparatus when an AC source has positive voltage.
Figure 4B:
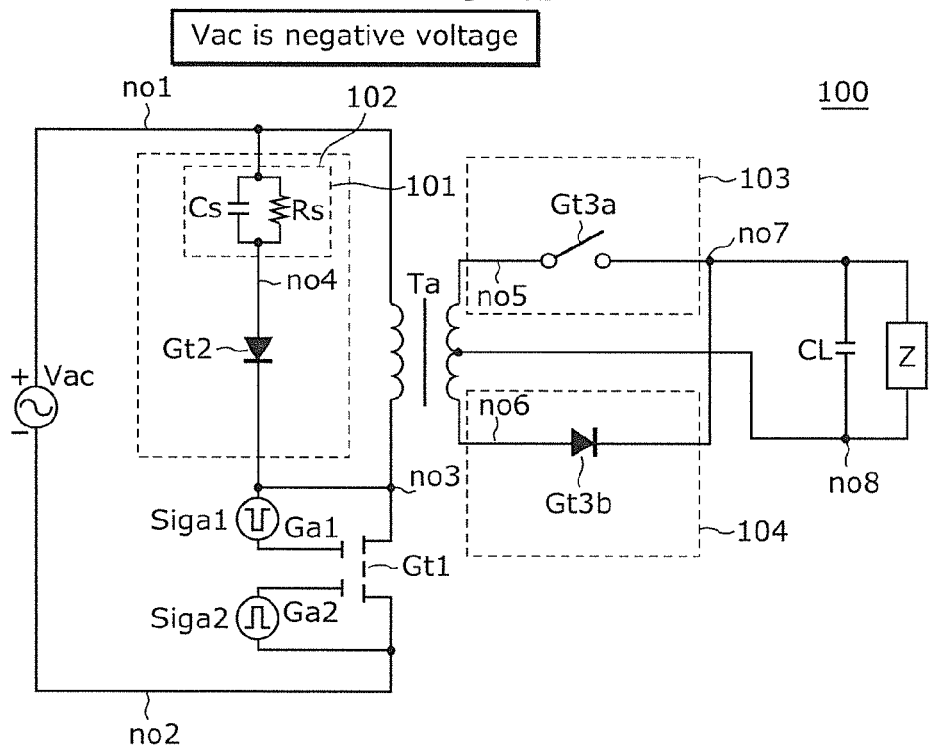
FIG. 4B is an equivalent circuit diagram of a switching power supply apparatus when the AC source has negative voltage.

Equivalent Circuit and Operation of the Switching Power Supply Apparatus 100 According to Voltage Polarity of AC Source FIG. 3 is a timing chart showing an example of an operation of the switching power supply apparatus 100. More specifically, FIG. 3 shows a voltage waveform of the AC source, and voltage waveforms of the control signals Siga1, Siga2, Sigb1, Sigb2, Sigc1, Sigc2, Sigd1 and Sigd2. FIG. 4A and FIG. 4B show equivalent circuits of the circuit in FIG. 1 at application of respective control signals according to the voltage polarity of the AC source. More specifically, FIG. 4A is an equivalent circuit diagram when AC voltage Vac of the AC source is positive voltage, and FIG. 4B is an equivalent circuit diagram when AC voltage Vac of the AC source is negative voltage.

Referring to FIG. 3, FIG. 4A, and FIG. 4B, descriptions will be given of the control signals and equivalent circuits of the circuit shown in FIG. 1.

When AC voltage Vac of the AC source is 0 V or above (positive voltage) (see FIG. 3 and FIG. 4A), the control signal Sigb1 of H and the control signal Sigb2 of L are applied to the bidirectional switch Gt2, and the bidirectional switch Gt2 serves as a diode having the node no3 as an anode and the node no4 as a cathode. The control signal Sigc1 of L and the control signal Sigc2 of H are applied to the bidirectional switch Gt3a, and the bidirectional switch Gt3a serves as a diode having the node no5 as an anode and the node no7 as a cathode. The control signal Sigd1 of L and the control signal Sigd2 of L are applied to the bidirectional switch Gt3b, and the bidirectional switch Gt3b turns into an non-conducting state.

When AC voltage Vac of the AC source is less than 0 V (negative voltage) (see FIG. 3 and FIG. 4B), the control signals Sigb1 of L and Sigb2 of H are applied to the bidirectional switch Gt2, and the bidirectional switch Gt2 serves as a diode having the node no4 as an anode and the node no3 as a cathode. The control signals Sigc1 of L and Sigc2 of L are applied to the bidirectional switch Gt3a, and the bidirectional switch Gt3 turns into an non-conducting state. The control signals Sigd1 of L and Sigd2 of H are applied to the bidirectional switch Gt3b, and the bidirectional switch Gt3b serves as a diode having the node no6 as an anode and the node no7 as a cathode.

In such a manner, switching between L and H of each of the controls signals Sigb1 and Sigb2 is synchronous with switching between polarities of the AC voltage Vac of the AC source. This allows switching between the states of the bidirectional switch Gt2 to be performed in synchronization with switching between the voltage polarities of the AC source.

More specifically, as described above, when H is applied to the gate G1 and L is applied to the gate G2, the bidirectional switch Gt2 exhibits the diode characteristic in that conduction is established in one of two directions as shown in the state 3 in FIG. 2B. On the other hand, when L is applied to the gate G1 and H is applied to the gate G2, the bidirectional switch Gt2 exhibits the diode characteristic in that conduction is established in the opposite direction to the direction in the state 3, as shown in the state 4 in FIG. 2B. This allows switching between the diode characteristics of the bidirectional switch Gt2 to be performed in synchronization with switching between the polarities of the AC voltage Vac of the AC source. More specifically, it is possible to switch between the directions of current flow in the Snubber circuit 101. As a result, the bidirectional switch Gt2 does not cause flow of extra current, which increases power conversion efficiency in the switching power supply apparatus 100.

Figure 5:
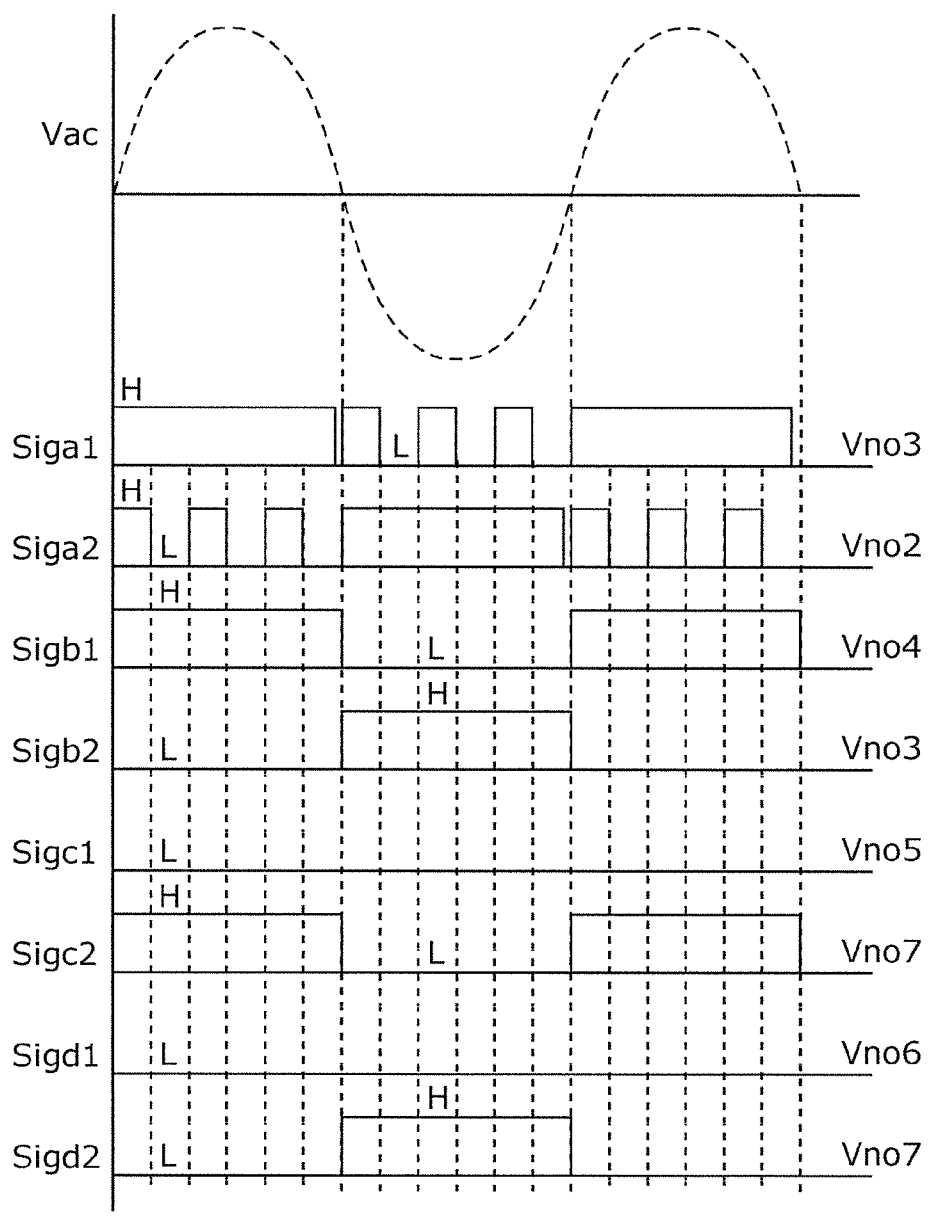
FIG. 5 is a timing chart showing another example of an operation of the switching power supply apparatus according to Embodiment1.

As shown in FIG. 4A and FIG. 4B, one of the gates Ga1 and Ga2 of the bidirectional switch Gt1 may be pulse-driven, and the other one may be controlled by the control signals Siga1 and Siga2 in synchronization with the polarity of AC voltage Vac of the AC source. For example, as shown in FIG. 5, one of the control signals Siga1 and Siga2 may be a pulse signal and the other one may be a signal that is synchronous with the polarity of AC voltage Vac of the AC source, and they may be alternately switched temporally.

Operation

Figure 6A:
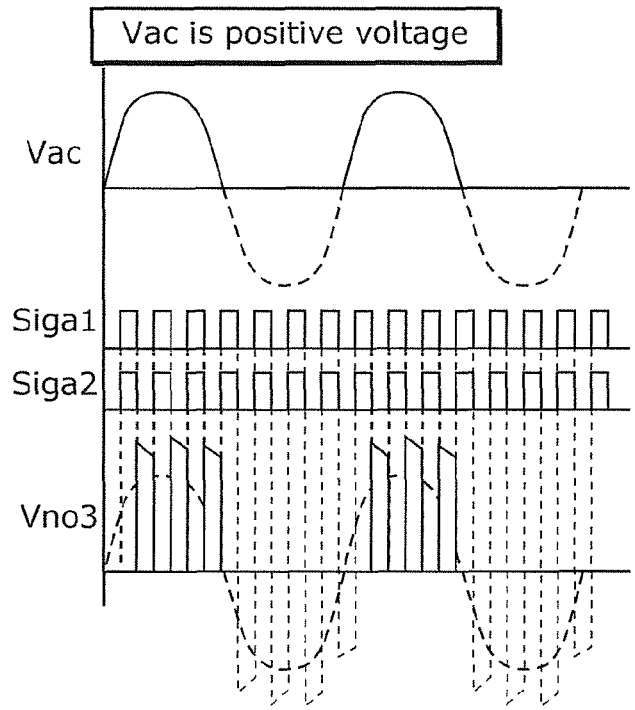
FIG. 6A is a timing chart showing voltage change at a node no3 when the AC source has positive voltage.
Figure 6B:
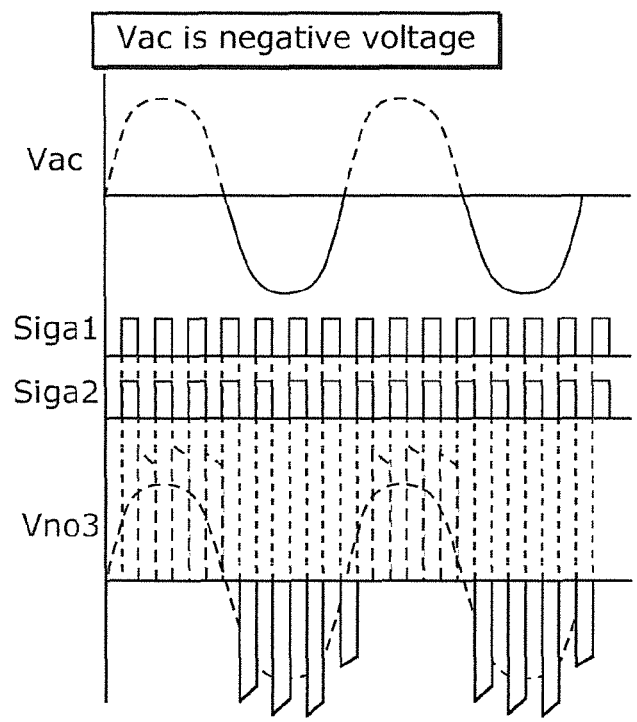
FIG. 6B is a timing chart showing voltage change at the node no3 when the AC source has negative voltage.

FIG. 6A is a timing chart showing voltage change in the node no3 when AC voltage Vac of the AC source is positive voltage. FIG. 6B is a timing chart showing voltage change in the node no3 when AC voltage Vac of the AC source is negative voltage.

Referring to FIG. 4A, FIG. 4B, FIG. 6A and FIG. 6B, a description is given of an operation of the switching power supply apparatus 100.

When AC voltage Vac of AC Source is Positive Voltage

When the control signal Siga1=the control signal Siga2=H, the bidirectional switch Gt1 is turned on, causing current to flow from the AC source to the series circuit which includes the primary winding of the transformer Ta and the bidirectional switch Gt1. Here, since the node no3 has voltage Vno3 that is equal to voltage Vno2 of the node not in potential, the condition is established in that "the voltage Vno1 of the node no1 is higher than the voltage Vno3 of the node no3", causing no current flow through the bidirectional switch Gt2 which exhibits the diode characteristic. Accordingly, the AC source supplies current only to the series circuit including the primary winding of the transformer Ta and the bidirectional switch Gt1.

Next, when the control signal Siga1=the control signal Siga2=L, the bidirectional switch Gt1 is turned off, interrupting current supply from the AC source to the series circuit including the primary winding of the transformer Ta and the bidirectional switch Gt1. Here, turn-off of the bidirectional switch Gt1 causes current at the secondary winding of the transformer Ta. The current is supplied to the smoothing capacitance CL via the bidirectional switch Gt3a which exhibits the diode characteristic, thereby generating DC voltage. At the same time, the voltage Vno3 of the node no3 becomes higher than the voltage Vno1 of the node no1. When the voltage Vno3 becomes higher than the voltage Vno1, current started to flow to the bidirectional switch Gt2 which exhibits the diode characteristic, and current flows from the node no3 to the node no1 via the voltage suppression circuit 102 including the capacitance Cs and the resistance Rs. This suppresses excessive increase in the voltage Vno3 of the node no3, and suppresses generation of a high potential difference between the source S1 and the source S2 of the bidirectional switch Gt1.

The operation when AC voltage Vac of the AC source is 0 V is similar to the operation when the AC voltage Vac of the AC source is positive voltage.

When AC voltage Vac of AC Source is Negative Voltage

When the control signal Siga1=the control signal Siga2=H, the bidirectional switch Gt1 is turned on, causing current to flow from the AC source to the primary winding of the transformer Ta and the bidirectional switch Gt1. Here, since the node no3 has voltage Vno3 that is equal to the voltage Vno2 of the node not in potential, the condition is established in that the voltage Vno1 of the node no1 is lower than the voltage Vno3 of the node no3, causing no current flow through the bidirectional switch Gt2 which exhibits the diode characteristic. Accordingly, the AC source supplies current only to the series circuit including the primary winding of the transformer Ta and the bidirectional switch Gt1.

Next, when the control signal Siga1=the control signal Siga2=L, the bidirectional switch Gt1 is turned off, interrupting current supply from the AC source to the series circuit including the primary winding of the transformer Ta and the bidirectional switch Gt1. Here, turn-off of the bidirectional switch Gt1 causes current at the secondary winding of the transformer Ta. The current is supplied to the smoothing capacitance CL via the bidirectional switch Gt3b which exhibits the diode characteristic, thereby generating DC voltage. At the same time, the voltage Vno3 of the node no3 becomes lower than the voltage Vno1 of the node no1. When the voltage Vno3 becomes lower than the voltage Vno1, current started to flow through the bidirectional switch Gt2 which exhibits the diode characteristic, and current is supplied, from the node no1 to the node no3, to the voltage suppression circuit 102 including the capacitance Cs and the resistance Rs. This suppresses excessive decrease in the voltage Vno3 of the node no3, and suppresses generation of a high potential difference between the source S1 and the source S2 of the bidirectional switch Gt1.

By including, in the switching power supply apparatus 100, the Snubber circuit 101 which includes the bidirectional switch Gt2 in such a manner, it is possible to suppress generation of a high potential difference between the source S1 and the source S2 of the bidirectional switch Gt1 when switching is performed on the bidirectional switch Gt1 in both cases when AC voltage Vac of the AC source is positive voltage and is negative voltage.

Gate Control Circuit

The above bidirectional switches Gt2, Gt3a and Gt3b are controlled by gate control circuits which control voltage of the two gates of the respective bidirectional switches.

Figure 7:
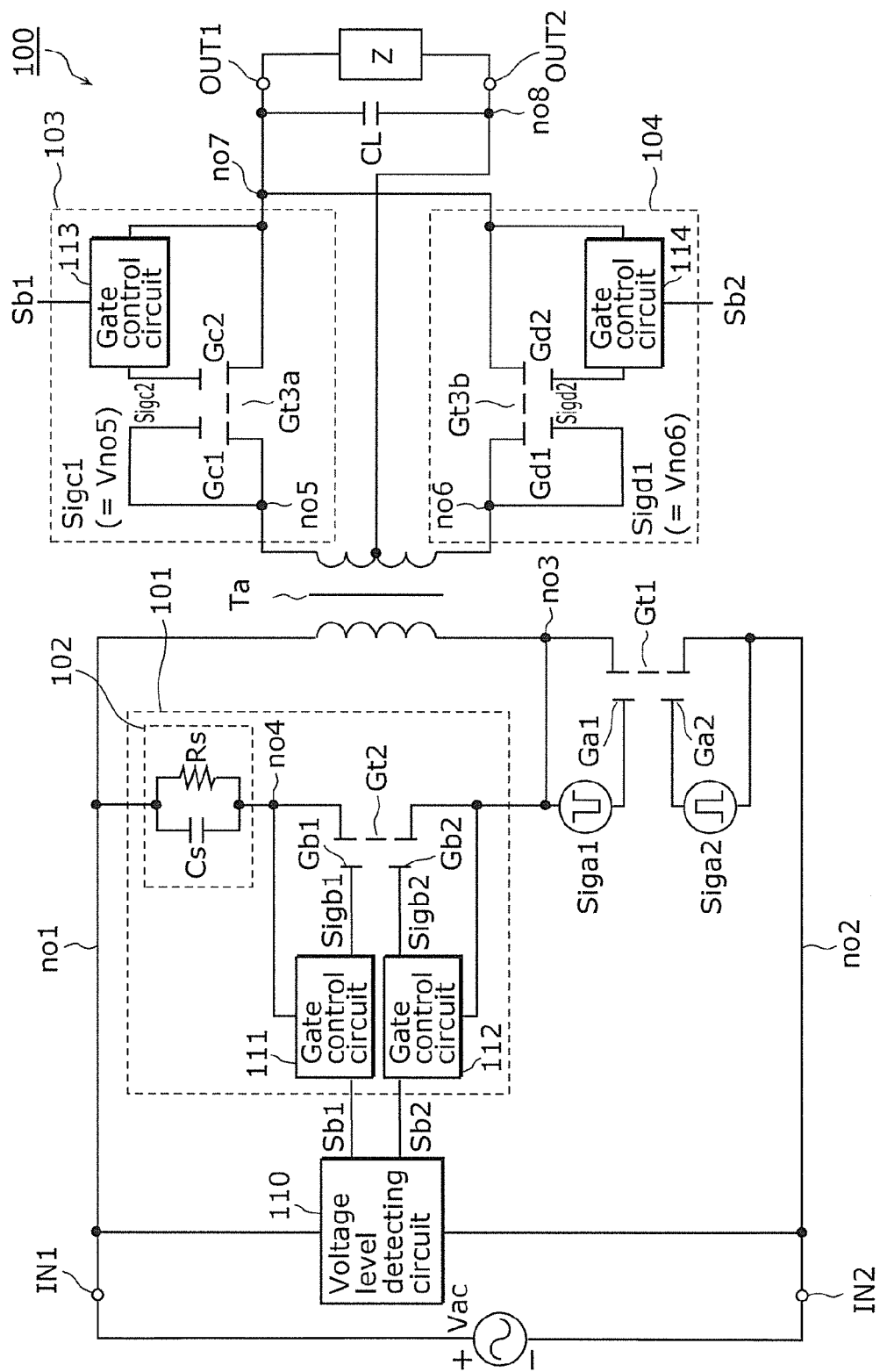
FIG. 7 is a circuit diagram showing an example of a switching power supply apparatus which includes a gate control circuit for controlling respective bidirectional switches.

FIG. 7 is a circuit diagram showing an example of a switching power supply apparatus which includes gate control circuits for controlling the bidirectional switches Gt2, Gt3a, and Gt3b.

As shown in FIG. 7, the switching power supply apparatus 100 includes a voltage level detecting circuit 110, and gate control circuits 111 to 114.

The voltage level detecting circuit 110 is a voltage polarity detecting circuit which detects the voltage polarity. More specifically, the voltage level detecting circuit 110 detects whether the voltage Vno1 of the node no1 is a positive voltage or a negative voltage relative to the voltage Vno2 of the node no2, and outputs a positive logic signal Sb1 and a reverse logic signal Sb2. The gate control circuit 111 outputs a control signal Sigb1 which is in phase with the positive logic signal Sb1 and has the voltage Vno4 of the node no4 as a reference voltage. The gate control circuit 112 outputs a control signal Sigb2 which is in phase with the reverse logic signal Sb2 and has the voltage Vno3 of the node no3 as a reference voltage. The gate control circuit 113 outputs a control signal Sigc2 which is in phase with the positive logic signal Sb1 and has the voltage Vno7 of the node no7 as a reference voltage. The gate control circuit 114 outputs a control signal Sigd2 which is in phase with the reverse logic signal Sb2 and has the voltage Vno7 of the node no7 as a reference voltage. Here, it is set such that the control signal Sigc1 of the bidirectional switch Gt3a is equal to the voltage Vno5 of the node no5 in potential, and that the control signal Sigd1 of the bidirectional switch Gt3b is equal to the voltage Vno6 of the node no6 in potential.

The gate control circuit 111 and the gate control circuit 112 correspond to the first control unit according to the one aspect of the present disclosure.

Figure 8:
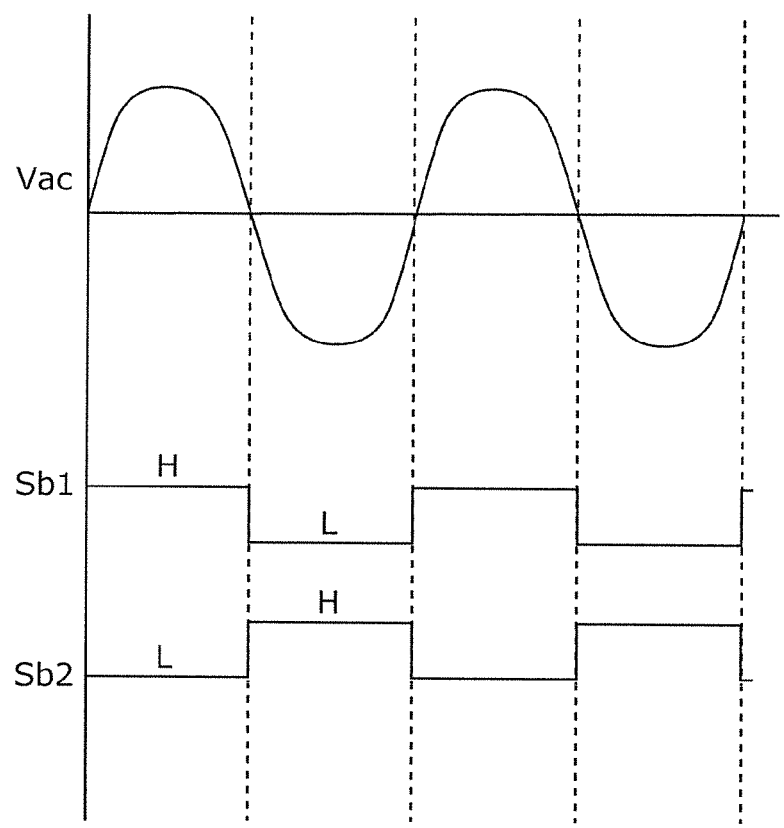
FIG. 8 is a timing chart showing an operation of a voltage level detecting circuit.

Next, referring to FIG. 8, a description is given of generation of bias applied to each gate of the bidirectional switches Gt2, Gt3a, and Gt3b. FIG. 8 is a timing chart showing an operation of the voltage level detecting circuit 110.

When AC voltage Vac of AC Source is Positive Voltage

The voltage level detecting circuit 110 detects that the AC voltage Vac of the AC source is positive voltage, and outputs a positive logic signal Sb1 of H and a reverse logic signal Sb2 of L which indicate the positive voltage. Accordingly, the gate control circuit 111 outputs a control signal Sigb1 of H, the gate control circuit 112 outputs a control signal Sigb2 of L, and the bidirectional switch Gt2 exhibits the diode characteristic in which the node no3 serves as an anode and the node no4 serves as a cathode. Furthermore, since the gate control circuit 113 outputs a control signal Sigc2 of H, and the control signal Sigc1=Vno5, the bidirectional switch Gt3a exhibits the diode characteristic in which the node no5 serves as an anode, and the node no7 serves as a cathode. Furthermore, the gate control circuit 114 outputs a control signal Sigd2 of L. Since the control signal Sigd1=Vno6, the bidirectional switch Gt3b turns into an non-conducting state. In accordance with above, the switching power supply apparatus 100 turns into the state represented by the equivalent circuit in FIG. 4A. Here, the current path at the secondary winding side, that is, the current path to the smoothing capacitance CL from the node no8 through the secondary winding of the transformer Ta, the node no5, the bidirectional switch Gt3a, and the node no7, corresponds to the first current path according to the another aspect of the present disclosure.

When AC Voltage Vac of AC Source is Negative Voltage

The voltage level detecting circuit 110 detects that the AC voltage Vac of the AC source is negative voltage, and outputs a positive logic signal Sb1 of L and a reverse logic signal Sb2 of H which indicate the negative voltage. Accordingly, the gate control circuit 111 outputs a control signal Sigb1 of L, the gate control circuit 112 outputs a control signal Sigb2 of H, and the bidirectional switch Gt2 exhibits the diode characteristic in which the node no4 serves as an anode and the node no3 serves as a cathode. The gate control circuit 113 outputs a control signal Sigc2 of L. Since the control signal Sigc1=Vno5, the bidirectional switch Gt3a turns into an non-conducting state. Furthermore, the gate control circuit 114 outputs a control signal Sigd2 of H. Since the control signal Sigd1=Vno6, the bidirectional switch Gt3b exhibits the diode characteristic in which the node no6 serves as an anode, and the node no7 serves as a cathode. In accordance with above, the switching power supply apparatus 100 turns into the state represented by the equivalent circuit in FIG. 4B. Here, the current path at the secondary winding side, that is, the current path to the smoothing capacitance CL from the node no8 through the secondary winding of the transformer Ta, the node no6, the bidirectional switch Gt3b, and the node no7, corresponds to the second current path according to the another aspect of the present disclosure.

As described above, the switching power supply apparatus 100 includes the voltage level detecting circuit 110 which determines the polarity of the AC voltage Vac of the AC source from the potential difference between the terminals of the series circuit including the primary winding of the transformer Ta and the bidirectional switch Gt1. With this, it is possible to detect the timing at which the polarity of AC voltage is switched. As a result, it is possible to more appropriately switch between the first current path and the second current path, which allows further increase in the power conversion efficiency in the switching power supply apparatus 100. The voltage level detecting circuit 110 corresponds to the voltage detecting circuit according to the yet another aspect of the present disclosure.

The Snubber circuit 101 further includes the gate control circuits 111 and 112 which control the bidirectional switch Gt2 by applying the control signal Sigb1 to the gate Gb1 and applying the control signal Sigb2 to the gate Gb2, respectively. The control signal Sigb1 repeatedly switches between H and L, and the control signal Sigb2 repeatedly switches between H and L in the opposite phase to the control signal Sigb1.

The switching power supply apparatus further includes the gate control circuits 113 and 114. The gate control circuit 113 applies, to the gate Gc2, the control signal Sigc2 which repeatedly switches between H and L. The gate control circuit 114 applies, to the gate Gd2, the control signal Sigd2 which repeatedly switches between H and L in the opposite phase to the control signal Sigc2. The gate Gc2 and the gate Gd2 respectively correspond to the sixth gate and the eighth gate according to the another aspect of the present disclosure. The control signal Sigc2 and the control signal Sigd2 respectively correspond to the fifth control signal and the sixth control signal according to the another aspect of the present disclosure. The gate control circuits 113 and 114 correspond to the gate control unit according to the one aspect of the present disclosure.

Furthermore, switching between the voltage levels of each of the control signal Sigc2 and the Sigd2 is synchronous with switching between the polarities of the AC voltage Vac of the AC source. With this, it is possible to appropriately switch between the first current path and the second current path, which increases the power conversion efficiency in the switching power supply apparatus 100.

Furthermore, the gate Gc1 is connected to one terminal of the secondary winding of the transformer Ta, and the gate Gd1 is connected to the other terminal of the secondary winding of the transformer Ta. This eliminates the need for providing a control unit for controlling the gates Gc1 and Gd1, which allows miniaturization of the switching power supply apparatus. The gate Gc1 corresponds to the fifth gate according to the one aspect of the present disclosure, and the gate Gd1 corresponds to the seventh gate according to the another aspect of the present disclosure.

Conclusion

As described above, the switching power supply apparatus 100 according to Embodiment 1 is a switching power supply apparatus which receives AC voltage Vac of the AC source. The switching power supply apparatus 100 includes: the transformer Ta including a primary winding and a secondary winding; the bidirectional switch Gt1 connected in series with the primary winding; and the Snubber circuit 100 connected in parallel with the primary winding. The AC voltage is applied to the series circuit including the primary winding and the bidirectional switch Gt1. The Snubber circuit 101 includes the bidirectional switch Gt2 for controlling the bidirectional switch Gt1.

As described above, by using the normally-off bidirectional switch Gt1 connected to the primary winding of the transformer Ta, it is possible to regulate current flowing through the primary winding of the transformer Ta. By including the Snubber circuit 101 which includes the bidirectional switch Gt2, it is possible to suppress generation of a high potential difference between the source S1 and the source S2 of the bidirectional switch Gt1. The gate Gb1 and the gate Gb2 of the bidirectional switch Gt2 respectively correspond to the first gate and the second gate according to the one aspect of the present disclosure.

Since the bidirectional switch Gt2 changes the direction of the diode according to the polarity of AC voltage Vac of the AC source, no extra current is caused. This increases the power conversion efficiency in the switching power supply apparatus 100.

More specifically, the switching power supply apparatus 100 is a switching power supply apparatus which receives AC voltage Vac of the AC source. The switching power supply apparatus 100 includes: the transformer Ta including the primary winding and the secondary winding; the bidirectional switch Gt1 connected in series with the primary winding; and the Snubber circuit 101 connected in parallel with the primary winding. The AC voltage is applied to the series circuit including the primary winding and the bidirectional switch Gt1. The Snubber circuit 101 includes the bidirectional switch Gt2 which is switchable between (i) the first diode characteristic in which conduction is established in a single direction and (ii) the second diode characteristic in which conduction is established in the opposite direction to the single direction. The bidirectional switch Gt2 corresponds to the second bidirectional switch according to the one aspect of the present disclosure, and the element according to the another aspect. The bidirectional switch Gt1 corresponds to the first bidirectional switch according to the aspect of the present disclosure, and the bidirectional switch according to the another aspect.

As described above, by using the bidirectional switch Gt1 connected to the primary winding of the transformer Ta, it is possible to regulate current flowing through the primary winding of the transformer Ta. By including the Snubber circuit 101 which uses the bidirectional switch Gt2, it is possible to suppress an increase in potential difference between the terminals of the bidirectional switch Gt1.

The switching power supply apparatus 100 further includes the voltage level detecting circuit 110, and the gate control circuits 111 and 112. The voltage level detecting circuit 110 switches between the diode characteristics of the bidirectional switch Gt2 in synchronization with the switching between the polarities of the AC voltage Vac of the AC source. The voltage level detecting circuit 110, and the gate control circuits 111 and 112 correspond to the control unit according to the another aspect of the present disclosure.

This allows switching between the diode characteristics of the bidirectional switch Gt2 to be performed in synchronization with switching between the polarities of the AC voltage Vac of the AC source. More specifically, it is possible to switch between the directions of current flow in the Snubber circuit 101. As a result, the bidirectional switch Gt2 does not cause flow of extra current, which increases power conversion efficiency in the switching power supply apparatus 100.

Furthermore, a portion, in the secondary winding of the transformer Ta, through which current flows is switched between the first current path and the second current path according to the polarity of AC voltage Vac of the AC source. Accordingly, it is possible to perform full-wave rectification on the current at the secondary winding of the transformer Ta generated by the AC source performing switching on the primary winding directly, and to obtain DV voltage. The first current path refers to a current path through which charges are supplied to the smoothing capacitance CL when AC voltage Vac of the AC source is positive voltage. The second current path refers to a current path through which charges are supplied to the smoothing capacitance CL when AC voltage Vac of the AC source is negative voltage.

More specifically, the switching power supply apparatus 100 includes: the rectifier circuits 103 and 104 which are provided between the terminals of the secondary winding of the transformer Ta and the output terminals OUT1 and OUT2, and which include the first and second current paths switchable between conduction and non-conduction. The AC voltage Vac of the AC source is applied to the series circuit including the primary winding of the transformer Ta and the bidirectional switch Gt1. The rectifier circuits 103 and 104 perform full-wave rectification on the voltage applied to the primary winding of the transformer Ta, by selectively switching between the first current path and the second current path such that conduction is established in one of the paths and non-conduction is established in the other path.

With this, it is possible to perform rectification at the secondary winding side when applying AC voltage to the primary winding of the transformer Ta. More specifically, it is possible to achieve the rectifier circuits 103 and 104 which are connected to the secondary winding of the transformer Ta. The rectifier circuits 103 and 104 each stores energy in the transformer Ta when the bidirectional switch Gt1 is on, and performs rectification when the bidirectional switch Gt1 is off. The rectifier circuits 103 and 104 correspond to the full-wave rectifier circuit according to the yet another aspect of the present disclosure.

More specifically, the secondary winding of the transformer Ta includes an intermediate terminal provided between the terminals. The first current path includes the bidirectional switch Gt3a between one terminal of the secondary winding and the output terminal OUT1. The second current path includes the bidirectional switch Gt3b between the other terminal of the secondary winding and the output terminal OUT1.

Each of the bidirectional switches Gt3a and Gt3b include two gates. The bidirectional switches Gt3a and Gt3b, the gates Gc1 and Gc2 of the bidirectional switch Gt3a, and the gates Gd1 and Gd2 of the bidirectional switch Gt3b respectively correspond to the third bidirectional switch, the fourth bidirectional switch, the fifth gate, the sixth gate, the seventh gate, and the eight gate according to the yet another aspect of the present disclosure.

The switching power supply apparatus according to Embodiment 1 is not limited to the configuration above.

For example, it may be that a normally-off bidirectional switch is used as the Snubber circuit 101 and the direction of the diode is controlled according to the polarity of AC voltage Vac of the AC source. The passive element in the voltage suppression circuit 102 need not be always included. Furthermore, a bidirectional zener diode may be added. Furthermore, ground may be used as a unit capable of suppressing the voltage Vno3 of the node no3. In such a case, the Snubber circuit 101 may be provided between the ground and the node no3.

Variation 1 of Embodiment 1

Figure 9:
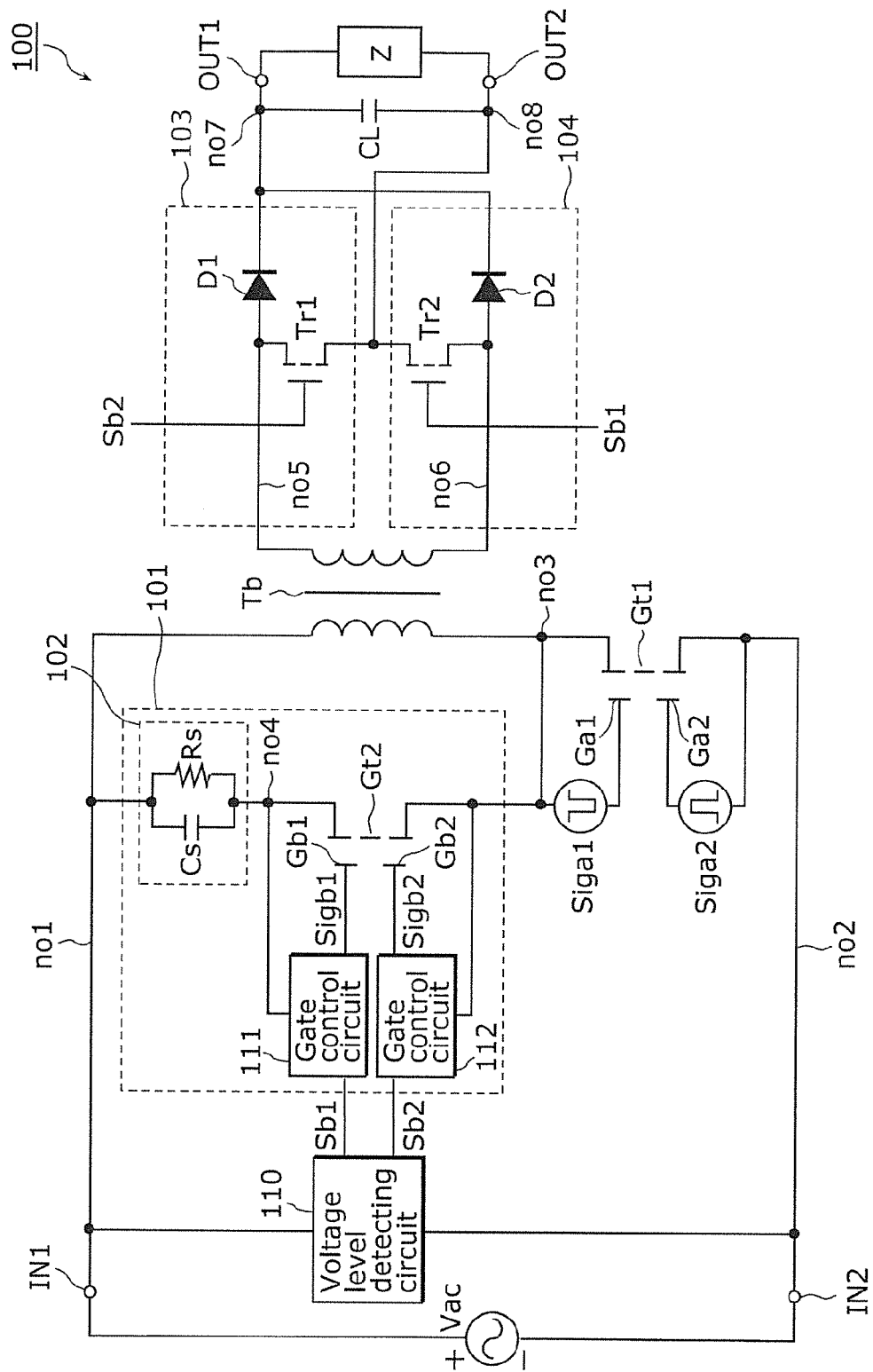
FIG. 9 is a circuit diagram showing a configuration of a switching power supply apparatus according to Variation 1 of Embodiment 1.

The switching power supply apparatus 100 may have a configuration as shown in FIG. 9. FIG. 9 is a circuit diagram showing a configuration of a switching power supply apparatus according to Variation 1 of Embodiment 1.

The switching power supply apparatus 100 shown in FIG. 9 is different from the switching power supply apparatus 100 shown in FIG. 7 in that (i) the transformer Ta having center taps at the secondary winding is replaced with a transformer Tb without center taps, and that (ii) full-wave rectification at the secondary winding of the transformer Tb is achieved by the rectifier circuit 103 which includes a diode D1 and a switch Tr1 that is controlled according to a reverse logic signal Sb2 and the rectifier circuit 104 which includes a diode D2 and a switch Tr2 that is controlled according to a positive logic signal Sb1. The node no8 is connected to the ground, and has a ground voltage.

This also allows switching between the first current path and the second current path according to the polarity of the AC source. Accordingly, it is possible to perform full-wave rectification on the current generated at the secondary winding side of the transformer Tb by performing switching on the AC voltage Vac of the AC source at the primary winding side, to obtain DC voltage. Furthermore, the switches Tr1 and Tr2 can be controlled by voltage that is relative to the ground, which allows reduction in component cost.

As described above, in the switching power supply apparatus 100 according to Variation 1 of Embodiment 1, the rectifier circuits 103 includes: the switch Tr1 which is provided between one terminal of the secondary winding of the transformer Ta and the ground, and which is capable of setting the voltage at the one terminal of the secondary winding of the transformer Ta to the ground voltage by being turned on according to the reverse logic signal Sb2; and the diode D1 provided between the one terminal of the secondary winding of the transformer Ta and the output terminal OUT1. The rectifier circuits 104 includes: the switch Tr2 which is provided between the other terminal of the secondary winding of the transformer Ta and which is capable of setting voltage at the other terminal of the secondary winding of the transformer Ta to the ground voltage by being turned on according to the positive logic signal Sb1; and the diode D2 provided between the other terminal of the secondary winding of the transformer Ta and the output terminal OUT1.

With this, a control unit and the like for switching between the first current path and the second current path need not be provided, allowing reduction in component cost. Furthermore, it is possible to obtain converted DC voltage that is relative to the ground voltage. The switch Tr1, the switch Tr2, the diode D1 and the diode D2 respectively correspond to the first switch, the second switch, the first diode, and the second diode according to the yet another aspect of the present disclosure.

Furthermore, in the switching power supply apparatus 100 according to Variation 1 of Embodiment 1, the switch Tr1 includes a gate, and is turned on according to the level of voltage applied to the gate. The switch Tr2 includes a gate, and is turned on according to the level of voltage applied to the gate. The switching power supply apparatus 100 further includes the voltage level detecting circuit 110 which applies, to the gate of the switch Tr1, the reverse logic signal Sb2 which repeatedly switches between H and L, and applies, to the gate of the switch Tr2, the positive logic signal Sb1 which repeatedly switches between H and L in the opposite phase to the reverse logic signal Sb2.

In other words, switching between the voltage levels of each of the positive logic signal Sb1 and the reverse logic signal Sb2 is synchronous with switching between the polarities of the AC voltage Vac of the AC source. The gate of the switch Tr1, the gate of the switch Tr2, the positive logic signal Sb1, the reverse logic signal Sb2, and the voltage level detecting circuit 110 respectively correspond to the ninth gate, the tenth gate, the tenth control signal, the ninth control signal, and the control circuit according to the yet another aspect of the present disclosure.

Full-wave rectification at the secondary winding side of the transformer Tb in FIG. 9 may be achieved by configuring each of the diodes D1 and D2 with a switch, adding an auxiliary winding to the transformer Tb, and controlling on and off of the switches by the voltage induced at the auxiliary winding to perform synchronous rectification.

Variation 2 of Embodiment 1

The method of performing full-wave rectification at the secondary winding side of the transformer Tb is not limited to the above method.

Figure 10:
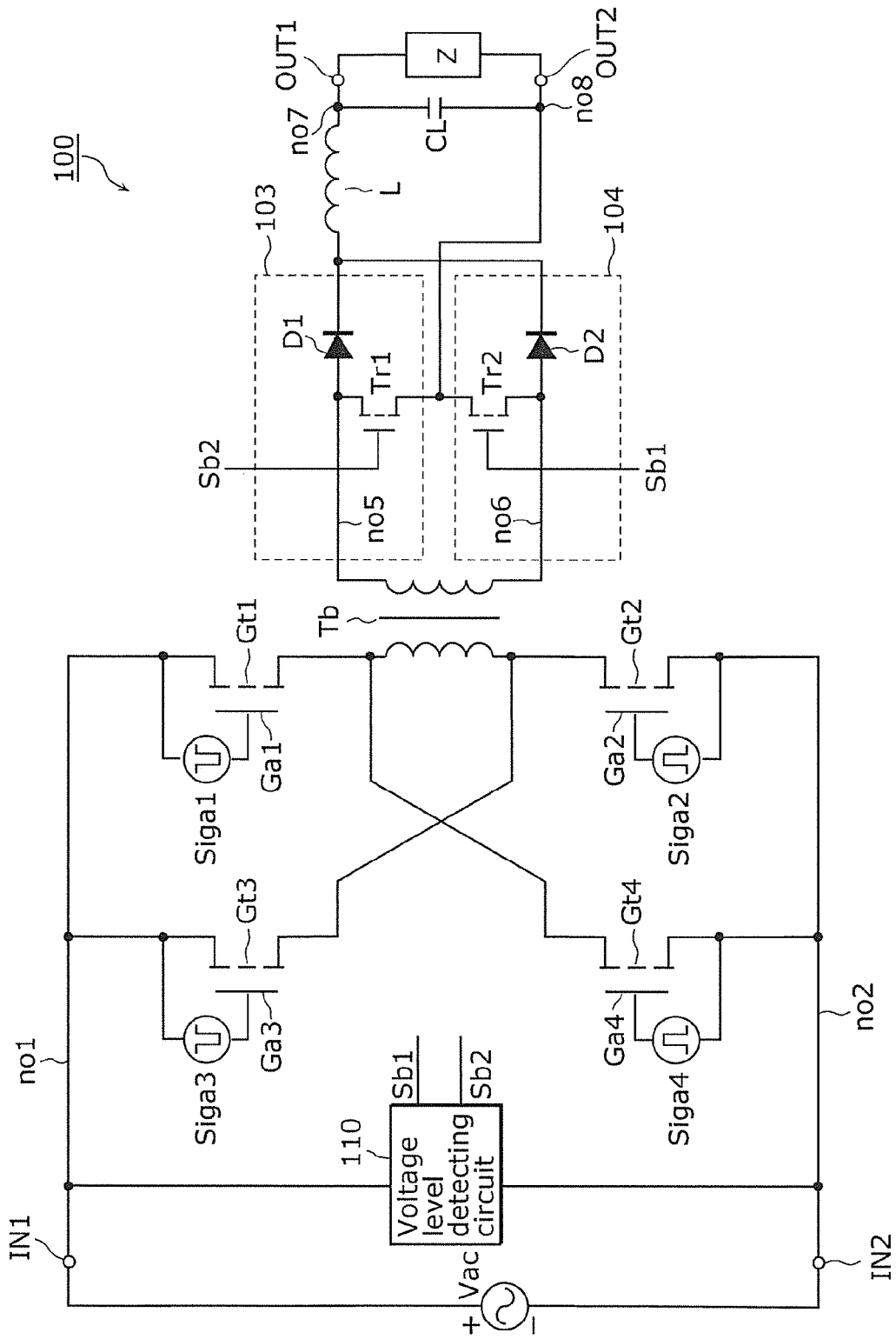
FIG. 10 is a circuit diagram showing a configuration of a switching power supply apparatus according to Variation 2 of Embodiment 1.

FIG. 10 is a circuit diagram showing a configuration of a switching power supply apparatus according to Variation 2 of Embodiment 1.

As shown in FIG. 10, the method of performing full-wave rectification at the secondary winding of the transformer Tb may be used as a unit capable of performing full-wave rectification on the secondary winding of the transformer Tb when the primary winding of the transformer Tb is driven by AC voltage, such as a full-bridge switching converter.

Embodiment 2

The switching power supply apparatus according to Embodiment 2 is substantially the same as the switching power supply apparatus 100 according to Embodiment 1, but is different in that the control signals applied to the gates Gb1 and Gb2 of the bidirectional switch Gt2 are in phase. Hereinafter, descriptions are given mainly on the points of the switching power supply apparatus according to Embodiment 2 that are different from the switching power supply apparatus 100 according to Embodiment 1.

Configuration

Figure 11:
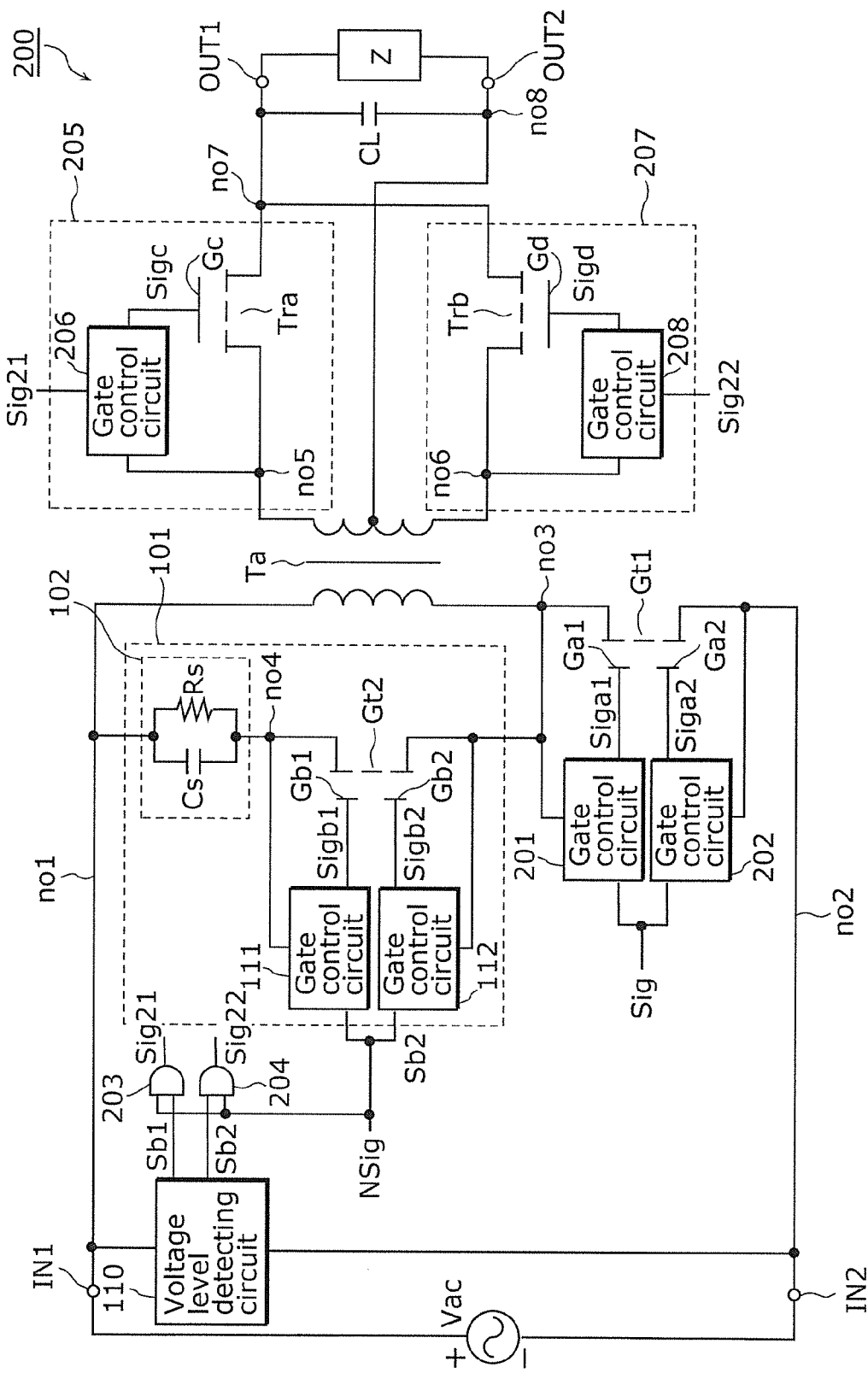
FIG. 11 is a circuit diagram showing a configuration of a switching power supply apparatus according to Embodiment 2.

FIG. 11 is a circuit diagram showing a configuration of a switching power supply apparatus 200 according to Embodiment 2 of the present disclosure.

The switching power supply apparatus 200 operates the bidirectional switch Gt2 and the switches Tra and Trb, in synchronization with the bidirectional switch Gt1.

A gate control circuit 201 have the voltage Vno3 of the node no3 as a reference voltage, and outputs the control signal Siga1 that is in phase with the control signal Sig. A gate control circuit 202 have the voltage Vno2 of the node not as a reference voltage, and outputs the control signal Siga2 that is in phase with the control signal Sig. AND circuits 203 and 204 perform logical operation on the control signal NSig that is in the opposite phase to the control signal Sig, and the positive logical signal Sb1 and the reverse logical signal Sb2 output from the voltage level detecting circuit 110. A rectifier circuit 205 includes a gate control circuit 206 which outputs a control signal Sigc having the voltage Vno5 of the node no5 as a reference voltage, and the switch Tra controlled by the gate control circuit 206. The rectifier circuit 207 includes a gate control circuit 208 which outputs a control signal Sigd having the voltage Vno6 of the node no6 as a reference voltage, and the switch Trb controlled by the gate control circuit 208.

Operation

Figure 12:
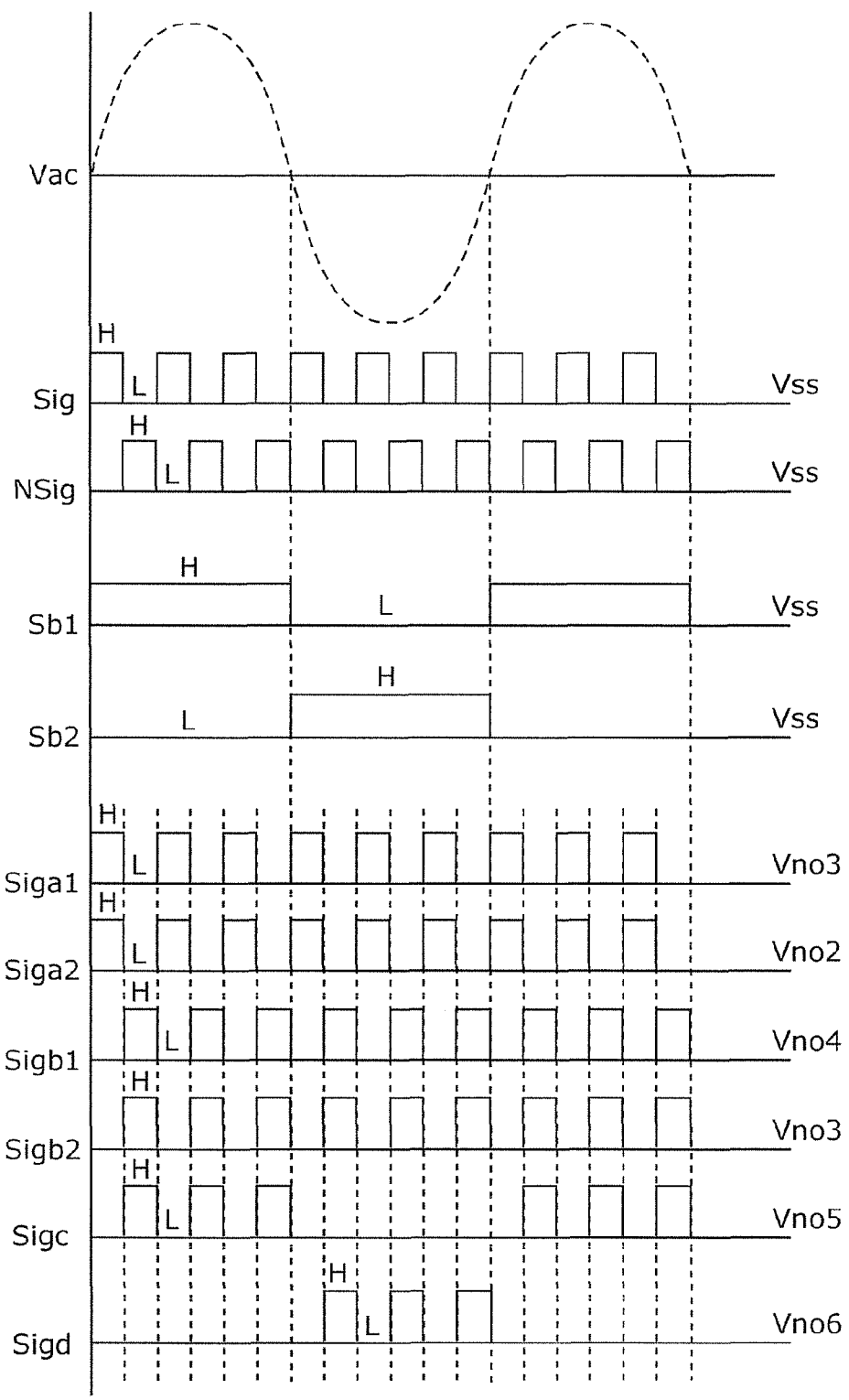
FIG. 12 is a timing chart showing an example of an operation of the switching power supply apparatus according to Embodiment 2.

Next, referring to FIG. 12, a description is given of an operation of the switching power supply apparatus 200 shown in FIG. 11. FIG. 12 is a timing chart showing an example of an operation of the switching power supply apparatus 200. More specifically, FIG. 12 shows voltage waveform of the AC source, and voltage waveforms of the control signals Sig and Nsig, the positive logic signal Sb1, the reverse logic signal Sb2, and the control signals Siga1, Siga2, Sigb1, Sigb2, Sigc, and Sigd.

Here, the control signal Sig is applied to the switching power supply apparatus 200 as a pulse signal. The control signal Nsig that is in the opposite phase to the control signal Sig is also applied to the switching power supply apparatus 200 as a pulse signal in the similar manner. The voltage level detecting circuit 110 outputs the positive logic signal Sb1 of H when AC voltage Vac of the AC source is 0 V or above (positive voltage), and outputs the reverse logic signal Sb2 of H when AC voltage Vac of the AC source is less than 0 V (negative voltage).

When AC voltage Vac of AC Source is Positive Voltage

When the control signal Sig is H, the bidirectional switch Gt1 is on, causing current to flow through the primary winding of the transformer Ta. On the other hand, since the control signal NSig is L, no current flows through the bidirectional switch Gt2, and the AC source supplies current only to the primary winding of the transformer Ta. At the secondary winding of the transformer Ta, too, controls signals Sig21 and Sig22 are low; and thus, the switches Tra and Trb are turned off, causing no current flow.

When the control signal Sig becomes L, the bidirectional switch Gt1 is turned off, making the voltage Vno3 of the node no3 higher than the voltage Vno1 of the node no1. At the same time, the control signal NSig becomes H, turning on the bidirectional switch Gt2 and causing current flow from the node no3 to the node no1 via the bidirectional switch Gt2. As a result, excessive increase in the voltage Vno3 of the node no3 is suppressed, suppressing generation of a high potential difference between the sources S1 and S2 of the bidirectional switch Gt1.

Furthermore, the current, which is generated at the secondary winding of the transformer Ta by the control signal Sig21 becoming H, flows to the smoothing capacitance CL via the switch Tra, thereby generating DC voltage.

When AC voltage Vac of AC Source is Negative Voltage

When the control signal Sig is H, the bidirectional switch Gt1 is turned on, causing current to flow through the primary winding of the transformer Ta. On the other hand, since the control signal NSig is L, no current flows through the bidirectional switch Gt2, and the AC source supplies current only to the primary winding of the transformer Ta. At the secondary winding side of the transformer Ta, too, the controls signals Sig21 and Sig22 are low; and thus, the switches Tra and Trb are turned off, causing no current flow.

When the control signal Sig becomes L, the bidirectional switch Gt1 is turned off, making the voltage Vno3 of the node no3 lower than the voltage Vno1 of the node no1. At the same time, the control signal NSig becomes H, turning on the bidirectional switch Gt2 and causing current flow from the node not to the node no3 via the bidirectional switch Gt2. As a result, excessive decrease in the voltage Vno3 of the node no3 is suppressed. Furthermore, current, which is generated at the secondary winding side of the transformer Ta by the control signal Sig22 becoming H, flows to the smoothing capacitance CL via the switch Trb, thereby generating DC voltage.

As described above, synchronous control of the Snubber circuit 101 and the rectifier circuits 205 and 207 at the secondary winding side of the transformer Ta also allows the AC voltage Vac of the AC source to be directly converted to power of the transformer Ta, and thereby generating DC voltage at the secondary winding side of the transformer Ta.

As described above, synchronous rectification performed by the rectifier circuits 205 and 207 according to Embodiment 2 produces power loss less than that in the rectifier circuits 103 and 104 according to Embodiment 1 which use the diode characteristics. As a result, the switching power supply apparatus 200 according to Embodiment 2 achieves power conversion efficiency higher than that of the switching power supply apparatus 100 according to Embodiment 1.

As described above, in the switching power supply apparatus 200 according to Embodiment 2, the control signal Sigb2 repeatedly switches between H and L in phase with the control signal Sib1.

Furthermore, the switching power supply apparatus 200 includes the gate control circuits 201 and 202 which controls the bidirectional switch Gt1 by applying the control signal Siga1 to the gate Ga1 and applying the control signal Siga2 to the gate Ga2. The control signal Siga1 repeatedly switches between H and L. The control signal Siga2 repeatedly switches between H and L in phase with the control signal Siga1. The control signals Sigb1 and Sigb2 are in the opposite phase to the control signals Siga1 and the Siga2. More specifically, the bidirectional switch Gt1 and the bidirectional switch Gt2 are operated with different characteristics. The gate Ga1 and the gate Ga2 of the bidirectional switch Gt1 respectively correspond to the third gate and the fourth gate according to the one aspect of the present disclosure. The gate control circuits 201 and 202 respectively correspond to the second control unit according to the one aspect of the present disclosure and the control unit according to the another aspect of the present disclosure.

The gate control circuit 206 in the rectifier circuit 205 may use an auxiliary winding of the transformer Ta, and include a switch between the auxiliary winding and the ground and controlled according to the control signal Sig21. The gate control circuit 208 in the rectifier circuit 207 may also use the auxiliary winding of the transformer Ta, and include a switch between the auxiliary winding and the ground and controlled according to the control signal Sig22.

Figure 13:
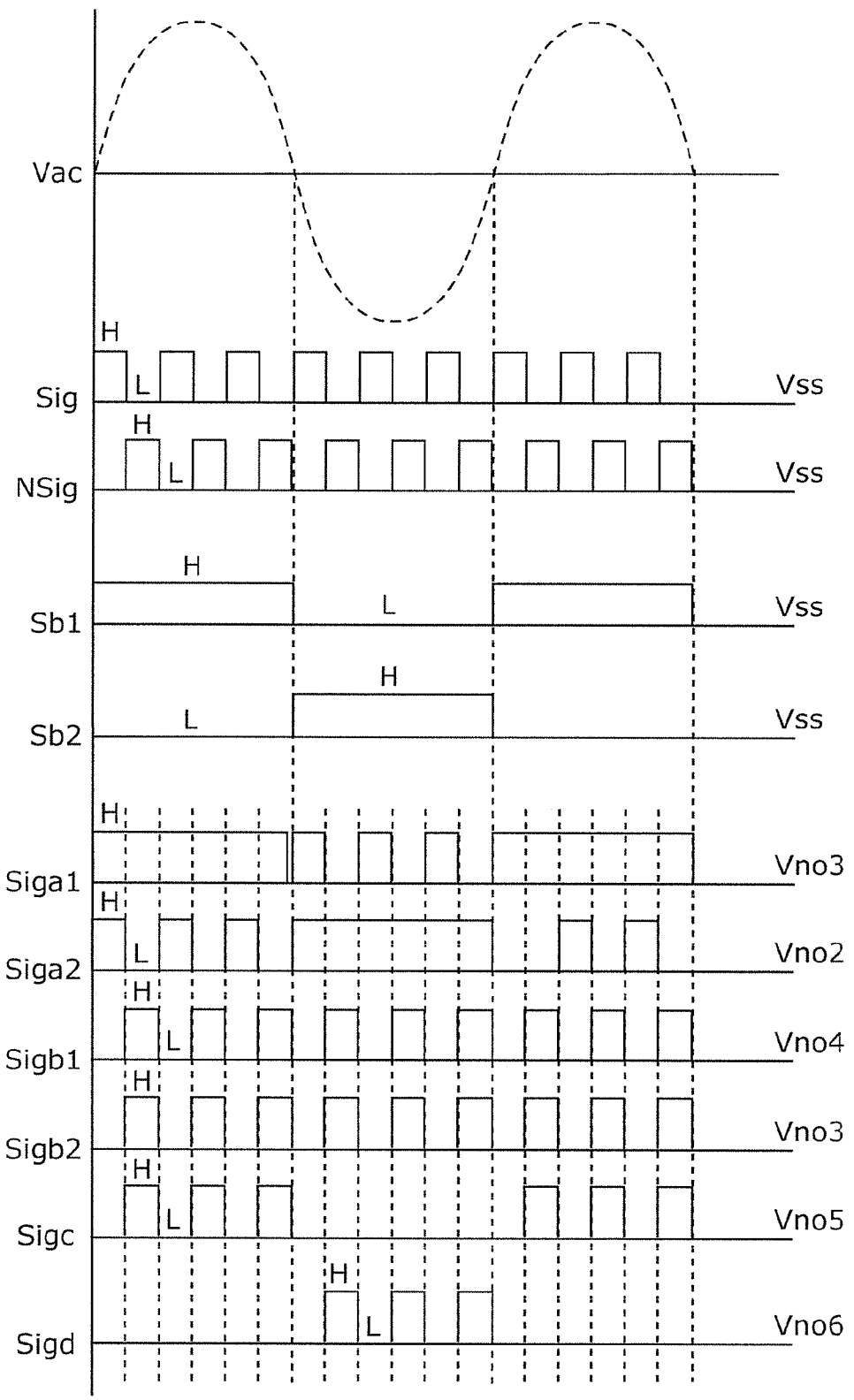
FIG. 13 is a timing chart showing another example of an operation of the switching power supply apparatus according to Embodiment 2.
Figure 14:
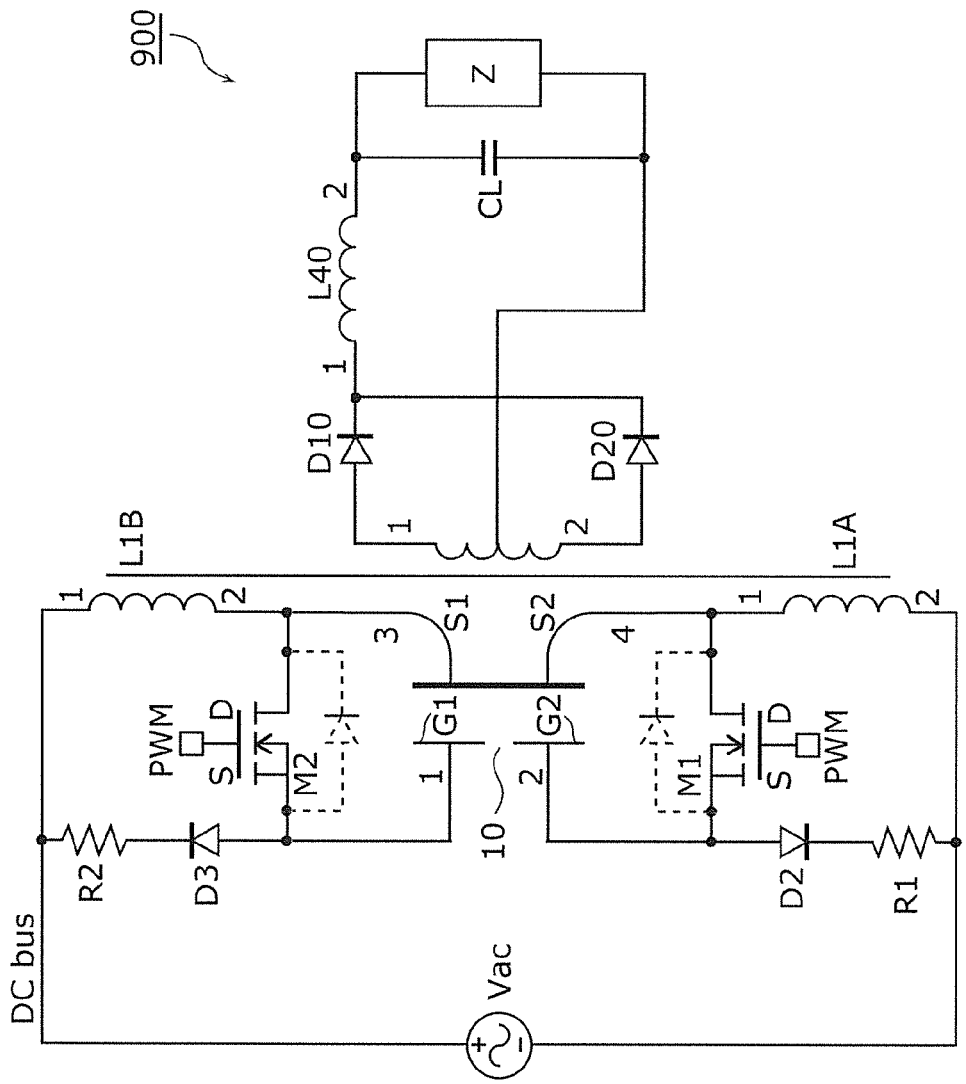
FIG. 14 is a circuit diagram showing a configuration of a switching power supply apparatus disclosed in Patent Literature (PTL) 1.

As shown in FIG. 13, one of the gates of the bidirectional switch Gt1 may be pulse-driven, and the other one may be controlled by the control signals Siga1 and Siga2 in synchronization with the voltage polarity of the AC source.

Descriptions have been given of the switching power supply apparatus according to one or more aspects of the present disclosure based on embodiments and variations thereof, but the present disclosure is not limited to the embodiments and the variations. Those skilled in the art will readily appreciate that many modifications are possible in the exemplary embodiments without materially departing from the novel teachings and advantages of the present disclosure. Accordingly, all such modifications are intended to be included within the scope of the present disclosure.

For example, it may be that the diodes D1 and D2 shown in FIG. 9 may be configured with switches, and the switches are synchronously controlled. With this, it is possible to switch between the first current path and the second current path with less loss. The first current path refers to the current path for supplying charges to the smoothing capacitance CL when AC voltage Vac of the AC source is positive voltage. The second current path refers to the current path for supplying charges to the smoothing capacitance CL when AC voltage Vac of the AC source is negative voltage. Furthermore, even if the diodes D1 and D2 are used, the similar advantageous effects can be obtained when diode losses are low.

INDUSTRIAL APPLICABILITY

The switching power supply apparatus according to the present disclosure is useful for power supply adapters used in, for example, home electronics or personal computers.

The invention claimed is:
1. A switching power supply apparatus which receives an AC voltage, the switching power supply apparatus comprising:
    a transformer including a primary winding and a secondary winding;
    a first bidirectional switch connected in series with the primary winding; and
    a Snubber circuit connected in parallel with the primary winding, wherein the AC voltage is applied to a series circuit including (i) the primary winding and (ii) the first bidirectional switch, and
the Snubber circuit includes a second bidirectional switch for controlling the first bidirectional switch.

2. The switching power supply apparatus according to claim 1, wherein the second bidirectional switch includes a first gate and a second gate.

3. The switching power supply apparatus according to claim 2,
wherein the Snubber circuit further includes a first control unit configured to control the second bidirectional switch by applying a first control signal to the first gate and applying a second control signal to the second gate,
the first control signal repeatedly switches between a first level voltage and a second level voltage that is different from the first level voltage, and
the second control signal repeatedly switches between the first level voltage and the second level voltage in opposite phase to the first control signal.

4. The switching power supply apparatus according to claim 3, wherein the switching between the first level voltage and the second level voltage of each of the first control signal and the second control signal is synchronous with switching between polarities of the AC voltage.

5. The switching power supply apparatus according to claim 4,
wherein the second bidirectional switch exhibits a diode characteristic in which conduction is established in one of two directions, when the first level voltage is applied to the first gate and the second level voltage is applied to the second gate, and
the second bidirectional switch exhibits a diode characteristic in which conduction is established in an opposite direction to the one of the two directions, when the second level voltage is applied to the first gate, and the first level voltage is applied to the second gate.

6. The switching power supply apparatus according to claim 2,
wherein the Snubber circuit further includes a first control unit configured to control the second bidirectional switch by applying a first control signal to the first gate and applying a second control signal to the second gate,
the first control signal repeatedly switches between a first level voltage and a second level voltage that is different from the first level voltage, and
the second control signal repeatedly switches between the first level voltage and the second level voltage, in phase with the first control signal.

7. The switching power supply apparatus according to claim 6,
wherein the first bidirectional switch includes a third gate and a fourth gate,
the switching power supply apparatus further comprises
a second control unit configured to control the first bidirectional switch by applying a third control signal to the third gate and applying a fourth control signal to the fourth gate,
the third control signal repeatedly switches between a third level voltage and a fourth level voltage that is different from the third level voltage,
the fourth control signal repeatedly switches between the third level voltage and the fourth level voltage, in phase with the third control signal, and
the first control signal and the second control signal are in an opposite phase to the third control signal and the fourth control signal.

8. The switching power supply apparatus according to claim 7,
wherein the second bidirectional switch exhibits a characteristic in which conduction is established in two directions, when the first level voltage is applied to the first gate and the first level voltage is applied to the second gate, and
the second bidirectional switch exhibits a characteristic in which no conduction is established in both of the two directions when the second level voltage is applied to the first gate and the second level voltage is applied to the second gate.

9. A switching power supply apparatus which receives an AC voltage, the switching power supply apparatus comprising:
a transformer including a primary winding and a secondary winding;
a bidirectional switch connected in series with the primary winding; and
a Snubber circuit connected in parallel with the primary winding,
wherein the AC voltage is applied to a series circuit including (i) the primary winding and (ii) the bidirectional switch, and
the Snubber circuit includes an element which is switchable between (i) a first diode characteristic in which conduction is established in a single direction and (ii) a second diode characteristic in which conduction is established in an opposite direction to the single direction.

10. The switching power supply apparatus according to claim 9, further comprising a control unit configured to switch between the first diode characteristic and the second diode characteristic of the element in synchronization with switching between polarities of the AC voltage.

11. A switching power supply apparatus which converts an input AC voltage into a DC voltage, the switching power supply apparatus comprising:
an output terminal for outputting the DC voltage;
a transformer including a primary winding and a secondary winding;
a first bidirectional switch connected in series with the primary winding, the first bidirectional switch including a first gate and a second gate; and
a full-wave rectifier circuit between (i) a first terminal and a second terminal of the secondary winding and (ii) the output terminal, the full-wave rectifier circuit including a first current path and a second current path each of which is switchable between conduction and non-conduction,
wherein the AC voltage is applied to a series circuit including (i) the primary winding and (ii) the first bidirectional switch,
the full-wave rectifier circuit performs full-wave rectification on a voltage applied to the primary winding, by performing selective switching such that conduction is established in one of the first current path and the second current path and no conduction is established in the other one of the first current path and the second current path, and
a first control signal is applied to the first gate of the first bidirectional switch and a second control signal is applied to the second gate of the first bidirectional switch, both of a frequency of the first control signal and a frequency of the second control signal are switched in synchronization with switching between polarities of the AC voltage, and when the frequency of the first control signal is a first frequency, the frequency of the second control signal is a second frequency which is different from the first frequency.

12. The switching power supply apparatus according to claim 11,
wherein the secondary winding includes an intermediate terminal between the first terminal and the second terminal of the secondary winding,
the first current path includes a third bidirectional switch between the first terminal of the secondary winding and the output terminal,
the second current path includes a fourth bidirectional switch between the second terminal of the secondary winding and the output terminal, and
the intermediate terminal is connected to ground.

13. The switching power supply apparatus according to claim 12,
wherein the third bidirectional switch includes a fifth gate and a sixth gate, and
the fourth bidirectional switch includes a seventh gate and a eighth gate.

14. The switching power supply apparatus according to claim 13, further comprising a control unit configured to apply, to the sixth gate, a fifth control signal which repeatedly switches between a first level voltage and a second level voltage, and apply, to the eighth gate, a sixth control signal which repeatedly switches between the first level voltage and the second level voltage, in an opposite phase to the fifth control signal.

15. The switching power supply apparatus according to claim 14, wherein the switching between the first level voltage and the second level voltage of each of the fifth control signal and the sixth control signal is synchronous with switching between polarities of the AC voltage.

16. The switching power supply apparatus according to claim 15,
wherein the fifth gate is connected to the first terminal of the secondary winding, and
the seventh gate is connected to the second terminal of the secondary winding.

17. The switching power supply apparatus according to claim 14, wherein the full-wave rectifier circuit includes:
a first switch between the first terminal of the secondary winding and ground, the first switch being capable of setting a voltage at the first terminal of the secondary winding to a ground voltage by being turned on according to the fifth control signal;
a second switch between the second terminal of the secondary winding and the ground, the second switch being capable of setting a voltage at the second terminal of the secondary winding to the ground voltage by being turned on according to the sixth control signal;
a first diode between the first terminal of the secondary winding and the output terminal; and
a second diode between the second terminal of the secondary winding and the output terminal.

18. The switching power supply apparatus according to claim 17,
wherein the first switch includes a ninth gate and is turned on according to a voltage applied to the ninth gate,
the second switch includes a tenth gate and is turned on according to a voltage applied to the tenth gate, and
the switching power supply apparatus further comprises
a control circuit which (i) applies, to the ninth gate, a fifth control signal which repeatedly switches between a first level voltage and a second level voltage, and (ii) applies, to the tenth gate, a sixth control signal which repeatedly switches between the first level voltage and the second level voltage, in an opposite phase to the fifth control signal.

19. The switching power supply apparatus according to claim 18, wherein the switching between the first level voltage and the second level voltage of each of the fifth control signal and the sixth control signal is synchronous with switching between polarities of the AC voltage.

20. The switching power supply apparatus according to claim 11, further comprises a voltage detecting circuit which determines a polarity of the AC voltage from a potential difference between two terminal of the series circuit including the primary winding and the bidirectional switch.

21. A switching power supply apparatus which converts an input AC voltage to a DC voltage to supply the DC voltage to a load, the switching power supply apparatus comprising:
a first output terminal and a second output terminal which are connected to each other with the load therebetween, and which are for outputting the DC voltage;
a transformer including a primary winding and a secondary winding; and
a first bidirectional switch connected in series with the primary winding,
wherein the AC voltage is applied to a series circuit including (i) the primary winding and (ii) the first bidirectional switch,
the secondary winding includes a first terminal, a second terminal, and a third terminal,
the switching power supply apparatus further comprises:
a second bidirectional switch between the first terminal and the first output terminal; and
a third bidirectional switch between the second terminal and the second output terminal, and
the third terminal is electrically connected to the second output terminal.

22. The switching power supply apparatus according to claim 21, wherein each of the first bidirectional switch, the second bidirectional switch and the third bidirectional switch includes a first gate and a second gate.

23. The switching power supply apparatus according to claim 21, wherein the second bidirectional switch and the third bidirectional switch are controlled according to a polarity of the AC voltage.

* * * * *